US006887449B2

(12) United States Patent
Brooks et al.

(10) Patent No.: US 6,887,449 B2
(45) Date of Patent: May 3, 2005

(54) METHOD OF QUANTITATIVELY PRODUCING AMMONIA FROM UREA

(75) Inventors: Burton Brooks, Bellevue, WA (US); Walter A. Jessup, Seattle, WA (US); Brian W. MacArthur, Redmond, WA (US)

(73) Assignee: The Chemithon Corporation, Seattle, WA (US)

( * ) Notice: Subject to any disclaimer, the term of this patent is extended or adjusted under 35 U.S.C. 154(b) by 246 days.

(21) Appl. No.: 10/302,531

(22) Filed: Nov. 21, 2002

(65) Prior Publication Data

US 2004/0101464 A1 May 27, 2004

(51) Int. Cl.[7] .............................................. C01C 1/08
(52) U.S. Cl. ...................................................... 423/358
(58) Field of Search ........................................ 423/358

(56) References Cited

U.S. PATENT DOCUMENTS

| 3,826,815 A | 7/1974 | Mavrovic | 423/356 |
| 3,900,544 A | 8/1975 | Lyon | 423/235 |
| 3,922,222 A | 11/1975 | Van Moorsel | 210/71 |

(Continued)

FOREIGN PATENT DOCUMENTS

| DE | 0154 442 | 3/1982 |
| DE | 342 21 75 | 12/1985 |
| DE | 195 10 804 | 9/1996 |
| DE | 195 81 575 T1 | 4/1997 |
| DE | 198 34 980 | 12/1999 |
| EP | 0 326 943 | 8/1989 |
| EP | 0 342 184 | 11/1989 |
| EP | 0 487 886 | 6/1992 |
| EP | 0 582 022 A1 | 2/1994 |
| EP | 0 848 985 | 6/1998 |

(Continued)

OTHER PUBLICATIONS

Kucheryavi et al., "Kinetics of the Hydrolysis of Urea at High Temperatures in Relation to Purification of Waste Waters in Urea Manufacture"; translated from *Zhurnal Prikladnoi Khimii*, vol. 42, No. 7, pp. 1596–1600 (1969).

Blasiak et al., "Equilibrium Pressure in the System $NH_4CO_2NH_2 + H_2O$ at High Temperatures"; *Chemia Stosowana*, vol. 4, No. 545, pp. 545–550 (1983), no month.

Makansi, Jason Ed.; "Ammonia: It's coming to a plant near you"; *Power* pp. 20–22 (May, 1992).

(Continued)

*Primary Examiner*—Wayne A. Langel
(74) *Attorney, Agent, or Firm*—Marshall, Gerstein & Borun LLP

(57) ABSTRACT

Methods and apparatus for continuously, quantitatively producing gaseous ammonia from urea, including the steps of: dissolving urea in water to form concentrated aqueous urea comprising at least 77 wt. % urea; continuously feeding the concentrated aqueous urea into a reactor; continuously feeding a separate, additional supply water into the reactor to form an aqueous urea reaction mixture; heating the aqueous urea reaction mixture; and continuously withdrawing a gas phase product including ammonia from the reactor, is disclosed. Also disclosed are methods and apparatus for continuous and batchwise dissolution of urea to form aqueous urea solutions.

20 Claims, 7 Drawing Sheets

U.S. PATENT DOCUMENTS

| | | | |
|---|---|---|---|
| 4,087,513 A | 5/1978 | Schell | 423/437 |
| 4,168,299 A | 9/1979 | Schell | 423/358 |
| 4,208,386 A | 6/1980 | Arand et al. | 423/235 |
| 4,220,632 A | 9/1980 | Pence et al. | 423/239 |
| 4,220,635 A | 9/1980 | Schell | 423/358 |
| 4,231,960 A | 11/1980 | Schmidt | 564/73 |
| 4,308,385 A | 12/1981 | Goorden | 544/201 |
| 4,314,077 A | 2/1982 | Zardi et al. | 564/70 |
| 4,325,924 A | 4/1982 | Arand et al. | 423/235 |
| 4,341,640 A | 7/1982 | Landis | 210/752 |
| 4,410,503 A | 10/1983 | van Nassau et al. | 423/359 |
| 4,456,535 A | 6/1984 | Zuidam et al. | 210/750 |
| 4,533,364 A | 8/1985 | Altman et al. | 55/5 |
| 4,552,979 A | 11/1985 | Stokes | 564/69 |
| 4,652,678 A | 3/1987 | Douwes | 564/73 |
| 4,731,233 A | 3/1988 | Thompson et al. | 423/231 |
| 5,034,030 A | 7/1991 | Miller et al. | 55/96 |
| 5,058,514 A | 10/1991 | Mozes et al. | 110/345 |
| 5,096,599 A | 3/1992 | Granelli | 210/750 |
| 5,098,680 A | 3/1992 | Fellows et al. | 423/235 |
| 5,223,238 A | 6/1993 | Czuppon | 423/359 |
| 5,240,688 A | 8/1993 | von Harpe et al. | 423/235 |
| 5,252,308 A | 10/1993 | Young | 423/358 |
| 5,262,138 A | 11/1993 | Young | 423/235 |
| 5,281,403 A | 1/1994 | Jones | 423/235 |
| 5,399,755 A | 3/1995 | Lagana | 564/63 |
| 5,489,420 A | 2/1996 | Diep | 423/235 |
| 5,543,123 A | 8/1996 | Hofmann et al. | 423/235 |
| 5,567,226 A | 10/1996 | Lookman et al. | 95/3 |
| 5,827,490 A | 10/1998 | Jones | 423/239.1 |
| 5,974,789 A | 11/1999 | Mathes et al. | 60/274 |
| 5,985,222 A | 11/1999 | Sudduth et al. | 423/235 |
| 5,985,224 A | 11/1999 | Lagana | 423/235 |
| 6,077,491 A | 6/2000 | Cooper et al. | 423/235 |
| 6,093,380 A | 7/2000 | Lagana et al. | 423/239.1 |
| 6,110,435 A | 8/2000 | Lehner et al. | 423/235 |
| 6,120,580 A | 9/2000 | Sandler | 95/11 |
| 6,146,605 A | 11/2000 | Spokoyny | 423/239.1 |
| 6,322,762 B1 | 11/2001 | Cooper et al. | 423/235 |
| 6,436,359 B1 * | 8/2002 | Spencer et al. | 423/235 |
| 6,471,927 B2 * | 10/2002 | Hofmann et al. | 423/239.1 |
| 6,506,350 B2 | 1/2003 | Cooper et al. | 423/235 |
| 6,511,644 B1 * | 1/2003 | MacArthur et al. | 423/358 |
| 6,761,868 B2 * | 7/2004 | Brooks et al. | 423/358 |
| 2001/0016183 A1 | 8/2001 | Hofmann et al. | |

FOREIGN PATENT DOCUMENTS

| | | |
|---|---|---|
| EP | 0 738 179 B1 | 4/1999 |
| EP | 1 019 321 A1 | 7/2000 |
| GB | 896660 | 5/1962 |
| GB | 1103041 | 2/1968 |
| JP | 53-52274 | 5/1978 |
| JP | 57-188560 | 11/1982 |
| JP | 59-82987 | 5/1984 |
| JP | 63-198713 | 8/1988 |
| JP | 63-224785 | 9/1988 |
| JP | 02-191528 | 7/1990 |
| JP | 02-268811 | 11/1990 |
| JP | 08-57258 | 3/1996 |
| JP | 08-57261 | 3/1996 |
| JP | 08-71372 | 3/1996 |
| JP | 08-215536 | 8/1996 |
| JP | 09-294913 | 11/1997 |
| JP | 11-171535 | 6/1999 |
| NL | 8105027 | 6/1983 |
| SU | 239863 | 8/1969 |
| WO | WO 92/02291 | 2/1992 |
| WO | WO 94/13391 | 6/1994 |
| WO | WO 95/09810 | 4/1995 |
| WO | WO 96/06674 | 3/1996 |
| WO | WO 96/27428 | 9/1996 |
| WO | WO 97/07876 | 3/1997 |
| WO | WO 98/42623 | 10/1998 |
| WO | WO 99/61136 | 12/1999 |
| WO | WO 00/07695 | 12/2000 |

OTHER PUBLICATIONS

Smith et al., "Integrated Dry $NO_x/SO_x$ Emissions Control System Low–$NO_x$ Combustion System SNCR Test Report," Public Service Company of Colorado, DOE Contract No. DE–FC22–91 PC90550 (Jun. 1994).

International Preliminary Examination Report (PCT) Application No. PCT/US98/05708 dated May 11, 1999, believed to be publicly available Oct., 1999.

Hunt et al., "Selective Non–Catalytic Operating Experience Using Both Urea and Ammonia" 1993 Joint Symposium on Stationary Combustion $No_x$, *Control* (May 1993).

Dr.–Ing. Ulrich Neumann; "Drei trockene Typen Das DENOX–Verfahren von Hitachi"; (Three Dry Types—The $DeNO_x$ Process from Hitachi), *Engergie* (Apr., 1986).

International Search Report for PCT/US02/09294 mailed Aug. 7, 2002.

* cited by examiner

METHOD OF QUANTITATIVELY PRODUCING AMMONIA FROM UREA

BACKGROUND

1. Field of the Invention

The invention generally relates to methods of producing ammonia. More particularly, the invention relates to methods of quantitatively producing ammonia from aqueous urea fed to a reactor.

2. Brief Description of Related Technology

The production of gaseous ammonia has been described using an aqueous mixture of urea at up to an equimolar concentration of urea in water, and typically at concentrations of 40 wt. % to 50 wt. %. See, for example, Young U.S. Pat. No. 5,252,308 (Oct. 12, 1993), Cooper et al. U.S. Pat. No. 6,077,491 (Jun. 20, 2000), and commonly-assigned U.S. patent application Ser. No. 09/951,287filed Sep. 12, 2001the respective disclosures of which are hereby incorporated herein by reference.

The production of gaseous ammonia has also been described, by common inventors, using a supply of molten urea. See commonly-assigned U.S. patent application Ser. No. 09/951,287filed Sep. 12, 2001.

SUMMARY

One aspect of the disclosure provides a method of quantitatively producing gaseous ammonia from urea, including the steps of: feeding concentrated aqueous urea including at least 77 wt. % urea into a reactor and feeding a separate, additional supply of water into the reactor to form an aqueous urea reaction mixture; heating the aqueous urea reaction mixture; and withdrawing a gas phase product including ammonia from the reactor.

Further aspects and advantages may become apparent to those skilled in the art from a review of the following detailed description, taken in conjunction with the drawings and the appended claims. While the invention is susceptible of embodiments in various forms, described hereinafter are specific embodiments with the understanding that the disclosure is illustrative, and is not intended to limit the invention to the specific embodiments described herein.

DETAILED DESCRIPTION

Figure 1:
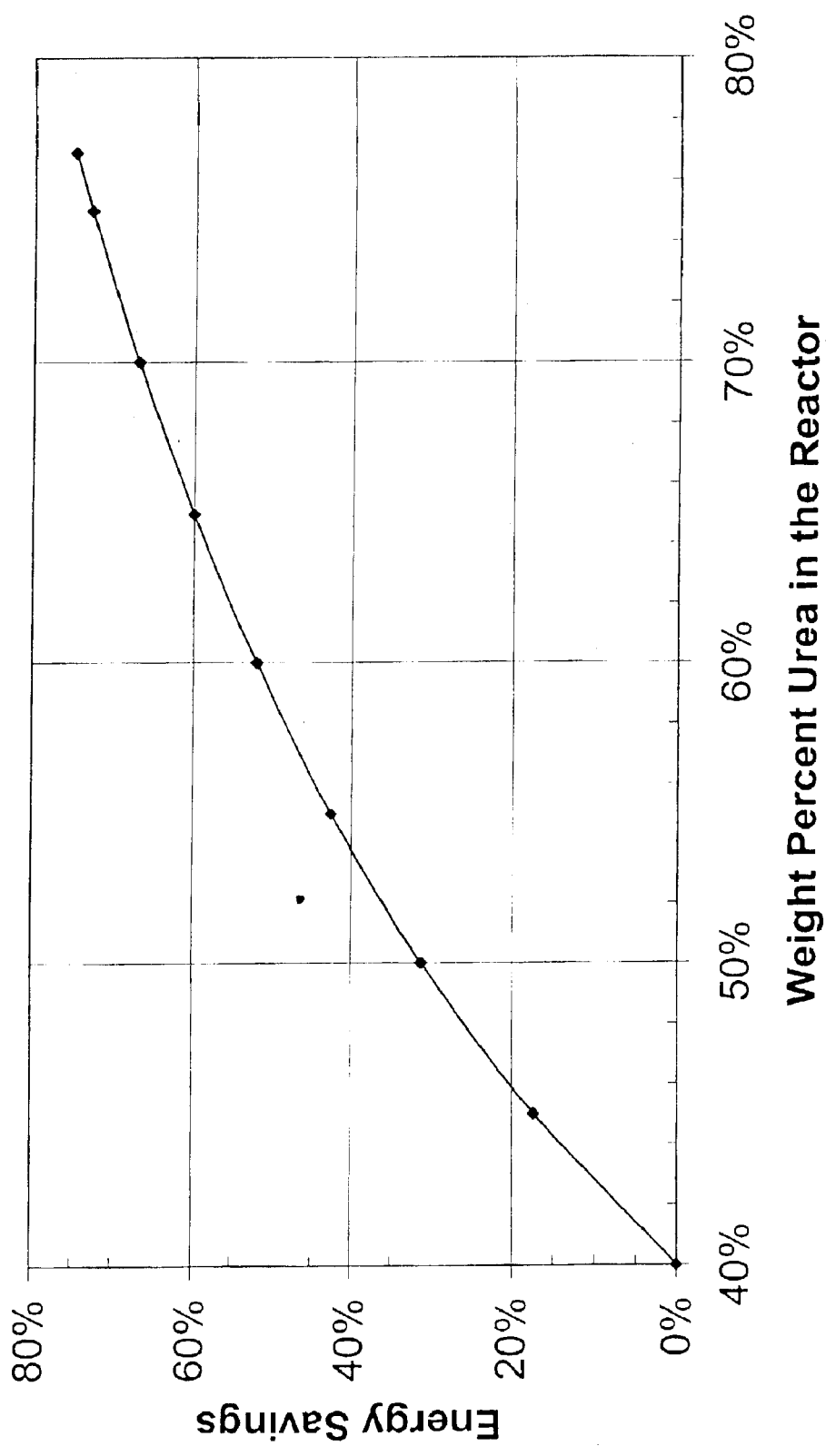
FIG. 1 illustrates the energy savings of processes that use concentrated urea solutions as feed, plotting energy savings, expressed as a percentage of the amount of energy required for a urea hydrolysis reactor using 40 wt. % urea as the feed, versus the weight percent of urea fed to the reactor (including urea-containing streams and water streams such as steam injection).

The invention generally relates to a method of quantitatively producing ammonia from concentrated aqueous urea fed to a reactor, and associated methods and apparatus for dissolving urea and carrying out the reaction.

One aspect of the disclosure is a method of continuously, quantitatively producing gaseous ammonia from urea, including the steps of dissolving urea in water to form concentrated aqueous urea; continuously feeding the concentrated aqueous urea into a reactor; continuously feeding a separate, additional supply of water into the reactor to form an aqueous urea reaction mixture; heating the aqueous urea reaction mixture; and continuously withdrawing a gas phase product including ammonia from the reactor.

The concentrated aqueous urea has a concentration of urea at least 77 wt. %, preferably greater than 77 wt. %, for example 80 wt. %, to benefit from the efficiencies gained by the method. Similarly, the concentration of urea is less than 100%, preferably 95 wt. % or less, more preferably 90 wt. % or less (the use of molten (100% concentration) urea is disclosed and claimed in commonly-assigned U.S. patent application Ser. No. 09/951,287). For example, a urea concentration of 88 wt. % or less is advantageous for use with an atmospheric storage tank.

The concentrated aqueous urea used in the method can be prepared as-needed, or a volume of concentrated aqueous urea can be prepared and stored for later use. Preferably, at least a small volume (relative to the throughput of the reactor) of concentrated aqueous urea is prepared and stored for use in responding to a surge in demand. A stored concentrated aqueous urea solution preferably is heated to prevent precipitation of solid urea, e.g., to a temperature greater than its saturation temperature (which will vary with the selected concentration), and also preferably less than about 140° C., to inhibit substantial hydrolysis during storage.

The concentration of the concentrated aqueous urea fed to the reactor can be monitored for example by using a Coriolis force mass flow meter (e.g., a MICRO MOTION Coriolis meter, available from Micro Motion, Inc. of Boulder, Colo.) and a temperature sensor together to calculate density and concentration.

The additional supply of water (e.g., process water) can be in any form, and preferably is injected as steam (e.g., saturated steam), to improve the efficiencies of the method.

A catalyst can be used in the urea hydrolysis method described herein. The catalyst can be added to one or more of the concentrated aqueous urea feed and the reactor. The catalyst preferably is a dispersed or dissolved solid. Preferred catalysts include polyprotic acids, ammonium salts of polyprotic acids, and mixtures thereof, for example, a mixture of mono-ammonium di-hydrogen phosphate and di-ammonium hydrogen phosphate.

It is known that certain acids and strong bases can promote the urea hydrolysis reaction (see Chao, *Urea, Its Properties and Manufacture*, Taipei, Taiwan, p. 97–118 (1967)), resulting in significantly faster rates of reaction. For example, addition of sodium hydroxide (a strong base) increases the rate of hydrolysis, but results in formation of sodium carbonate as a by-product. Thus, sodium hydroxide, if used, must be continually added as a reactant and sodium carbonate must be removed as a by-product to sustain the process. Acid catalysts can also be used, such as an acid selected from the group consisting of polyprotic acids, ammonium salts of polyprotic acids, and combinations thereof. In one embodiment, the acid catalyst is selected from the group consisting of phosphoric acid, mono-ammonium di-hydrogen phosphate, di-ammonium hydrogen phosphate, and combinations thereof.

Various methods of controlling the process to produce ammonia can be used. See commonly-assigned U.S. patent application Ser. No. 09/951,287 for methods of controlling urea hydrolysis processes that are sufficiently analogous to one of ordinary skill in the art. Generally, the method disclosed herein includes the steps of heating the aqueous urea in the reactor and withdrawing the gas phase products to maintain temperature in the reactor in a selected range and to maintain pressure in the reactor in a selected range. In a preferred method, the temperature is in a range of about 155° C. to about 175° C. and the pressure is in a range of about 80 psig to about 200 psig. In one advantageous embodiment, the process is controlled to produce a gaseous product stream of constant ammonia concentration, e.g., by controlling the temperature to a constant set point and controlling the pressure to a constant set point. This constant temperature and pressure are maintained regardless of production rate (e.g., demand for ammonia).

The gaseous product stream that includes ammonia can be used for any process, preferably in processes wherein the presence of carbon dioxide gas is not disruptive. Accordingly, in one embodiment, the method includes the step of feeding the gaseous stream including ammonia to a flue gas conditioning apparatus, e.g., for one or more of a SCR, SNCR, or particulate removal operations.

Heretofore, the use of aqueous urea in concentrated solutions above an equimolar concentration was not contemplated, likely due to the need to maintain storage and handling systems at elevated temperature. The saturation temperatures of various concentrations of aqueous urea are shown in Table 1below.

TABLE 1

| Temperature, ° C. | Wt. % Urea |
|---|---|
| 0 | 40.01 |
| 20 | 51.92 |
| 40 | 62.55 |
| 60 | 71.51 |
| 80 | 80.00 |
| 100 | 88.00 |

As used herein, the term "saturation temperature" is defined as the temperature at which a solution of urea in water first forms a visible solid crystal upon cooling (therefore corresponding to a saturated solution at said temperature). Generally, the temperature and the concentration of urea solution at saturation are directly related, such that at higher temperature the saturation concentration increases.

Surprisingly, the use of a concentrated aqueous urea solution has been found to have significant advantages and efficiencies in comparison to a typical 40 wt. % to 50 wt. % aqueous urea hydrolysis process, in large part due to the energy required to vaporize excess water (supplied with the feed solution in the dilute aqueous feed) fed to the hydrolysis reactor. For example, FIG. 1 illustrates the energy savings of processes that use more concentrated urea solutions as feed. The figure plots the energy savings, expressed as a percentage of the amount of energy required for a urea hydrolysis reactor using 40 wt. % urea as the feed, versus the weight percent of urea fed to the reactor (including urea-containing streams and water streams such as steam injection), up to the theoretical equimolar limit of about 76 wt. % required to sustain the hydrolysis reaction. FIG. 1 represents only the energy requirements of the reactor.

In addition, the use of a concentrated aqueous urea solution also has advantages and efficiencies in comparison to one or more molten urea processes disclosed in commonly-assigned U.S. patent application Ser. No. 09/951,287. A concentrated aqueous urea solution can be supplied to the urea hydrolysis reactor at much lower temperature than is required for pure molten urea. This avoids potential urea pyrolysis reactions, and operational difficulties encountered when working with a molten material.

Another aspect of the disclosure is a method of continuously dissolving urea, and apparatus associated therewith. The method includes the steps of measuring the liquid level in a urea dissolving tank, transmitting a level control signal to a solid urea flow controller, mass metering urea into the tank at a rate proportional to the control signal (e.g., at a rate proportional to a liquid level differential from a normal or nominally full level), metering a proportional amount of water into the tank; and heating the contents of the dissolving tank to supply the required heat of solution (endothermic for urea) and preferably any heat necessary to maintain a temperature in the tank greater than the saturation temperature of the concentrated aqueous solution. The mass flow of both urea and water are therefore maintained in a fixed ratio and the concentration of the aqueous urea solution is therefore determined.

In another continuous dissolving embodiment, an additional holding tank is provided to enable the liquid level of the primary mixing tank to be fixed using an overflow process. Accordingly, in such a process includes the steps of measuring the liquid level in a urea holding tank, transmitting a level control signal to a solid urea flow controller, mass metering urea into a urea dissolving tank at a rate proportional to the control signal, metering a proportional amount of water into the dissolving tank, heating the contents of the mixing tank to supply the required heat of solution (endothermic for urea) and preferably any heat necessary to maintain a temperature in the tank greater than the saturation temperature of the concentrated aqueous solution, and heating the contents of the holding tank to maintain a temperature in the tank greater than the saturation temperature of the concentrated aqueous solution.

Still another aspect of the disclosure is a method of dissolving urea batchwise, and apparatus associated therewith. The method includes the steps of measuring the liquid level in a urea holding tank, draining aqueous urea from a mixing tank into the urea holding tank in response to the liquid level in the urea holding tank reaching a preset level, feeding a fixed mass of urea into the urea mixing tank, feeding a fixed mass of water into the urea mixing tank, heating the contents of the mixing tank to supply the required heat of solution (endothermic for urea) and preferably any heat necessary to maintain a temperature in the tank greater than the saturation temperature of the concentrated aqueous solution, agitating the urea mixing tank contents, and heating the urea mixing tank contents. The mixing tank can be operated with a heel of aqueous urea of the desired concentration.

EXAMPLES

The following examples are provided to illustrate the invention but are not intended to limit the scope of the invention.

Examples 1 and 2 compare the use of concentrated aqueous urea to low-concentration aqueous urea and to molten urea, respectively.

Example 1

This example quantitatively compares the use of and 80 wt. % concentrated aqueous urea feedstock to a 40 wt. % aqueous urea feedstock for urea hydrolysis to produce gaseous ammonia. A 100 lb/hr (45 kg/hr) ammonia production rate is used as a basis for comparison. The comparison is based on catalyzed urea hydrolysis using a MAP/DAP (monoammonium dihydrogen phosphate/diammonium hydrogen phosphate) catalyst, with a constant temperature and constant pressure control method, as described in commonly assigned U.S. patent application Ser. No. 09/951,287.

As described below, use of 80 wt. % aqueous urea compares favorably with the use of 40 wt. % aqueous urea as a feed solution in a process for production of gaseous ammonia by urea hydrolysis. Much less energy is required to sustain the operation of the reactor because less "excess water" has to be evaporated. The overall process system (including dissolving and hydrolysis systems) is more energy efficient, the dissolving equipment may be made relatively smaller (less volume for same quantity of urea solids), and the product gas volume will be smaller (less water vapor present), enabling smaller diameter discharge pipelines and saving expense for piping materials, tracing and insulation, and associated operating costs.

Figure 2:
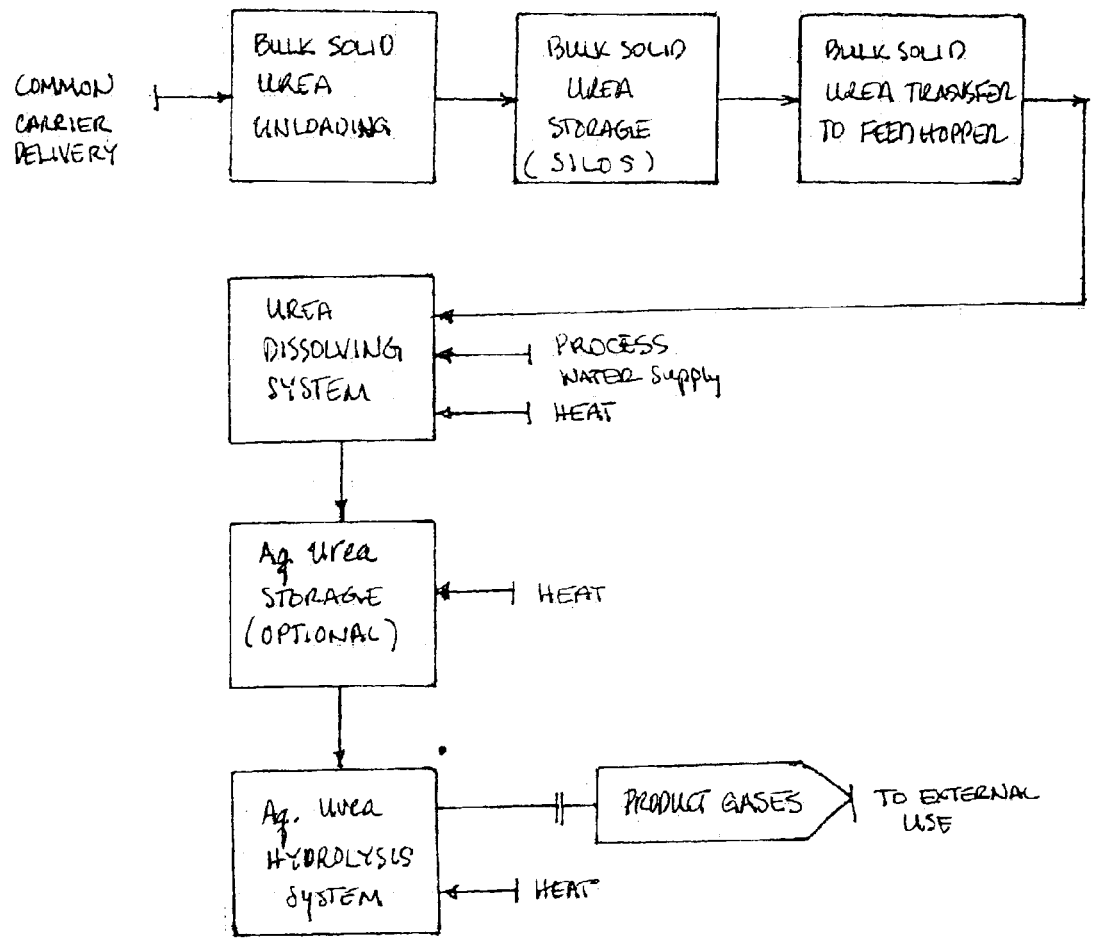
FIG. 2 is a block diagram of a urea hydrolysis process according to the disclosure that employs concentrated aqueous urea.

FIG. 2 illustrates the overall concept of the process in a block diagram, including delivery of bulk solid urea granules to a site of use, unloading the solid urea granules to a storage facility (silos are commonly employed), transferring the solid urea granules to a feed hopper and mass metering system, a urea dissolving subsystem designed to make aqueous urea at a constant and controlled concentration, a subsystem for storing or surge of the desired aqueous urea solution, and a continuous urea hydrolysis subsystem design to produce a gaseous mixture including ammonia for use in an external process. Certain steps in the process, as illustrated, require heat input.

Table 2 below summarizes the results of the quantitative comparison.

TABLE 2

| Urea Feed Concentration | 80 wt. % Aqueous | 40 wt. % Aqueous |
| --- | --- | --- |
| Utilities Steam Consumption 200 psig (1380 kPa) | | |
| Urea Dissolver | 40 lb/hr (18 kg/hr) | 20 lb/hr (9 kg/hr) |
| Reactor Heating Steam | 191 lb/hr (87 kg/hr) | 519 lb/hr (235 kg/hr) |
| Injection Steam | 132 lb/hr (60 kg/hr) | 0 lb/hr (0 kg/hr) |
| Total Steam | 364 lb/hr (165 kg/hr) | 539 lb/hr (244 kg/hr) |
| Water Consumption | 44 lb/hr (20 kg/hr) | 265 lb/hr (120 kg/hr) |
| Total Water in Reactor | 176 lb/hr (80 kg/hr) | 265 lb/hr (120 kg/hr) |
| Reactor Heat Exchanger Surface Area | 24.15 ft$^2$ (2.24 m$^2$) | 65.57 ft$^2$ (6.1 m$^2$) |
| Product Gas Mass | | |
| Ammonia | 100 lb/hr (45 kg/hr) | 100 lb/hr (45 kg/hr) |
| Carbon Dioxide | 129 lb/hr (59 kg/hr) | 129 lb/hr (59 kg/hr) |
| Water | 123 lb/hr (56 kg/hr) | 212 lb/hr (96 kg/hr) |
| Weight Percent | | |
| Ammonia | 28 wt. % | 23 wt. % |
| Carbon Dioxide | 37 wt. % | 29 wt. % |
| Water | 35 wt. % | 48 wt. % |
| Total Reactants Volume | 29.78 ACFM (0.84 m$^3$/min) | 39.09 ACFM (1.1 m$^3$/min) |

Utility Steam

Energy balance calculations were performed for complete aqueous urea hydrolysis systems including both urea dissolving and urea hydrolyzing steps. The energy required to vaporize excess water (supplied with the feed solution) in the hydrolysis reactor was the most significant difference in the comparative analysis. Thus, when 40 wt. % urea is prepared and used, 20 lb/hr of 200 psig steam is consumed in the dissolving step and 519 lb/hr in the urea hydrolysis step for a total of 539 lb/hr. When making and using 80 wt. % urea as a feed solution, the dissolving step uses 40 lb/hr of 200 psig steam, 191 lb/hr are used in the auxiliary heater for the hydrolysis reactor, and 132 lb/hr and injected directly into the reaction mixture to supply additional process water and vapor for the equilibrium product gas mixture for a total of 364 lb/hr. Thus, even though more energy is used in the dissolving step, this quantity is relatively small, and in the complete system use of concentrated aqueous urea results in a savings of 175 lb/hr of 200 psig steam, a reduction of 32.5%. The calculation assumes that process water is supplied at 55° F.

Urea Dissolving Step

Examining the process step whereby solid urea granules are dissolved to make the aqueous urea feed solution, 176 lb/hr of urea must be dissolved in both cases to support ammonia production at a rate of 100 lb/hr. This step requires 265 lb/hr of process water to make a 40 wt. % solution, but only 44 lb/hr of process water to make the 80 wt. % solution. However, the urea dissolving process has to be operated at a temperature safely and controllably above the saturation temperature for the respective concentration. Therefore, in this calculation saturation temperatures of 50° F. (10° C.) for the 40 wt. % urea case and 194° F. (90° C.) for the 80 wt. % urea case are assumed. The energy balance results in about 20 lb/hr of 200 psig steam for the 40 wt. % urea case and about 40 lb/hr in the 80 wt. % case. The heat transfer area required (dissolving 176 lb/hr of urea and heating to the specified temperature) is 0.25 ft$^2$ (0.023 m$^2$) for the 40 wt. % case and 0.87 ft$^2$ (0.081 m$^2$) for the 80 wt. % case, consistent with the difference in temperature.

Equipment size is another factor affected by the difference in dissolving urea to make a concentrated mixture versus a dilute mixture. The simplest basis for comparison is a single tank, batch mixer. Solid urea can be obtained in one-ton (2,000 lb; 907 kg) super sacks, which may be used advantageously in a dissolving system, and so has been assumed for the sizing basis. The dissolving tank is advantageously equipped with an agitator driven by an electric motor. The tank volume must be sufficient to contain the resulting batch of solution with a reasonable allowance for excess volume. Therefore, an additional 1.5 ft (0.46 m) of vessel height above the batch liquid level was assumed sufficient. Suitable dissolving tank properties are provided in Table 3 below, for comparison.

TABLE 3

| 2,000 lb Batch Dissolving Tank | 80 wt. % Case | 40 wt. % Case |
| --- | --- | --- |
| Diameter | 3.5 ft (1.07 m) | 4 ft (1.22 m) |
| Height | 5 ft (1.52 m) | 7.5 ft (2.29 m) |
| Volume | 34 ft$^3$ (0.96 m$^3$) | 72 ft$^3$ (2.04 m$^3$) |
| Surface Area (right circular cylinder) | 74.2 ft$^2$ (6.89 m$^2$) | 110.4 ft$^2$ (10.26 m$^2$) |
| Mixer Power | 3.91 hp (2.92 kW) | 7.12 hp (5.31 kW) |

Thus, it can be seen that the physical size of the dissolving tank is smaller for the 80 wt. % case and the dissolver also uses less mixing energy. Smaller and more energy efficient equipment will also be less costly to purchase and operate. On the other hand, the concentrated aqueous urea must be stored at an elevated temperature. Assuming an ambient temperature of 50° F. (10° C.), the 40 wt. % solution will have no heat loss to the environment, whereas the 80 wt. % solution, stored at a temperature at least about 194° F. (90° C.), will have a heat loss of about 13,245 BTU/hr (3.88 kW) using 2.5 inch (6.35 cm) insulation, for example, or 15,923 BTU/hr (4.67 kW) using 2 inch (5.08 cm) insulation. Thus, the comparison of the dissolving step has factors that are advantageous for the 80 wt. % urea solution, and the extra steam consumption required has been shown to be relatively inconsequential when combined with the energy savings in the hydrolysis step, as described below.

Urea Hydrolysis Step

The 80 wt. % urea case has been based upon steam injection to the reactor at a rate equivalent to operating with a 1:1 ratio of total process water to urea on a mass basis. Thus, the feed solution contains 176 lb/hr of urea and 44 lb/hr of liquid water. Therefore, the injection steam flow rate is set at 132 lb/hr. The 40 wt. % urea case does not benefit from injection of steam, since more than sufficient water is supplied in the feed solution. In fact, the energy required to vaporize all of the extra water in the 40 wt. % urea case is the main energy difference.

The calculations for 100 lb/hr of ammonia show a clear advantage to the 80 wt. % case in terms of energy efficiency and required heat transfer surface area. At 40 wt. % urea, the reactor requires 519 lb/hr of 200 psig utility steam and 65.57 ft$^2$ of heat transfer surface area, whereas the 80 wt. % urea case requires only 191 lb/hr of utility steam and 24.15 ft$^2$ of heat transfer area. When 80 wt. % urea is used, the inlet feed solution has more sensible heat energy and excess process water is supplied by injecting steam into the reaction mixture. In addition, there is no excess liquid water to vaporize; instead, the injected steam is partially cooled and condensed to maintain the concentration of the reaction mixture at equilibrium, and this contributes heat of condensation and sensible heat to the mixture.

Product Gas Stream

The values in Table 2 show that in both cases, 100 lb/hr of ammonia and 129 lb/hr of carbon dioxide gas are discharged from the hydrolysis reactor, but the quantity of water vapor discharged at equilibrium is quite different. For 40 wt. % urea feed, 212 lb/hr of water is discharged, and the total gas flow rate is calculated to be 39.09 actual cubic feet per minute (ACFM) at 335° F. (168° C.) and 60 psig (414 kPa) pressure in the product gas pipeline. This compares to the 80 wt. % urea case, in which only 123 lb/hr of water vapor are discharged in a total product gas stream of 29.78 ACFM at the same conditions. Thus, the volumetric flow rate is reduced by nearly 25% by use of the 80 wt. % urea feed and injection of additional process water to a 1:1 ratio as steam.

Furthermore, the calculated dew point temperature of the product gas mixture depends on the composition of the stream, particularly the concentration of water vapor. The dew point temperature is the temperature at which the first droplet of condensate forms upon cooling the mixture at a constant pressure. It is a practical requirement that the product gas stream be maintained at a temperature above its dew point, so that the product remains in the gas phase state. Calculated dew point temperatures are plotted in FIG. 3 as a function of pressure for 40 wt. %, 50 wt. %, and 55 wt. % urea feed solutions. As shown in the figure, in the pressure range of interest, the theoretical dew point is reduced as the concentration of urea increases. It is advantageous to have a lower dew point temperature, because it is relatively easier and more efficient to maintain the stream above a lower temperature.

Example 2

Commonly assigned U.S. patent application Ser. No. 09/951,287 describes methods of urea hydrolysis employing molten urea. The molten urea processes have certain advantages over use of dilute (e.g., 40 wt. % or 50 wt. % urea). However, use of a concentrated aqueous urea feedstock also has certain advantages over the molten case.

As described above, an aqueous urea solution at 80 wt. % urea requires a temperature of at least 80° C. to avoid crystal formation. The urea solution is relatively stable, and heating it up to more than about 90° C. did not result in any significant reaction (hydrolysis or pyrolysis). The solution has a low viscosity and is compatible with common chemical pumping and metering equipment, provided that the surfaces in contact with the liquid are maintained above the saturation temperature.

For comparison, in the molten urea method, the molten urea must be maintained at a temperature above its melting point (132.7° C.) by a reasonable safety margin. To do this requires, for example, steam jacketed equipment and piping, and controlled regulated steam systems to maintain the molten urea in a temperature range from about 135° C. to about 145° C., for example. Even in this temperature range, some reaction of molten urea to decomposition products may occur. If not due to traces of water present in the solid urea, thermal decomposition or pyrolysis of the urea begins to occur according to published studies at about 143° C., and proceeds faster at higher temperatures. Therefore, ammonia fumes may be present in the urea melter, which require a means of management such as a fume scrubber. In addition, any gas that may evolve by reaction in the molten urea in the feed system may cause problems, for example by making it more difficult to pump. The higher temperature of molten urea (relative to the concentrated aqueous urea case) requires utility steam at a higher pressure. Higher temperatures also require more insulation as there is a greater driving force for heat losses to the environment. Furthermore, when molten urea cools to the freezing point, the solid urea that forms on cold spots can rapidly clog up process equipment and piping systems, preventing continuous operation. By contrast, when a concentrated aqueous urea solution cools to the saturation temperature and below, a slushy mixture of crystallized urea forms, which remains fluid and pumpable. The relative consequences of a deviation in temperature are therefore much more manageable in the concentrated aqueous urea case.

Example 3

A concentrated (81 wt. %) aqueous urea solution was fed to a MAP/DAP-catalyzed reaction system with a separate stream of injection steam to continuously produce gaseous ammonia using a constant temperature and constant pressure control method, as described in commonly assigned U.S. patent application Ser. No. 09/951,287. The product gas including ammonia was fed to a sulfuric acid scrubber. The reactor operating conditions are shown in Table 4 below.

TABLE 4

| Condition | Value (approx.) |
|---|---|
| Catalyst % MAP | 16.654 |
| Catalyst % DAP | 55.397 |
| Reactor % water | 20.8 |
| 81 wt. % urea flow | 120 lb/hr (54.5 kg/hr) |
| Urea pump pressure | 100 psig (689 kPa) |
| Urea mass flow meter temperature | 193° F. (89.4° C.) |
| Vapor production flow rate out | 211 lb/hr (95.7 kg/hr) |
| Vapor temp. after outlet flow meter | 286° F. (141° C.) |
| Reactor pressure | 90 psig (620 kPa) |
| Reactor temperature | 323° F. (162° C.) |
| Injection steam to 81 wt. % urea flow | 0.77 |
| Injection steam flow | 92 lb/hr (41.7 kg/hr) |
| Reactor heating steam flow | 123 lb/hr (55.8 kg/hr) |

Example 4

Figure 4:
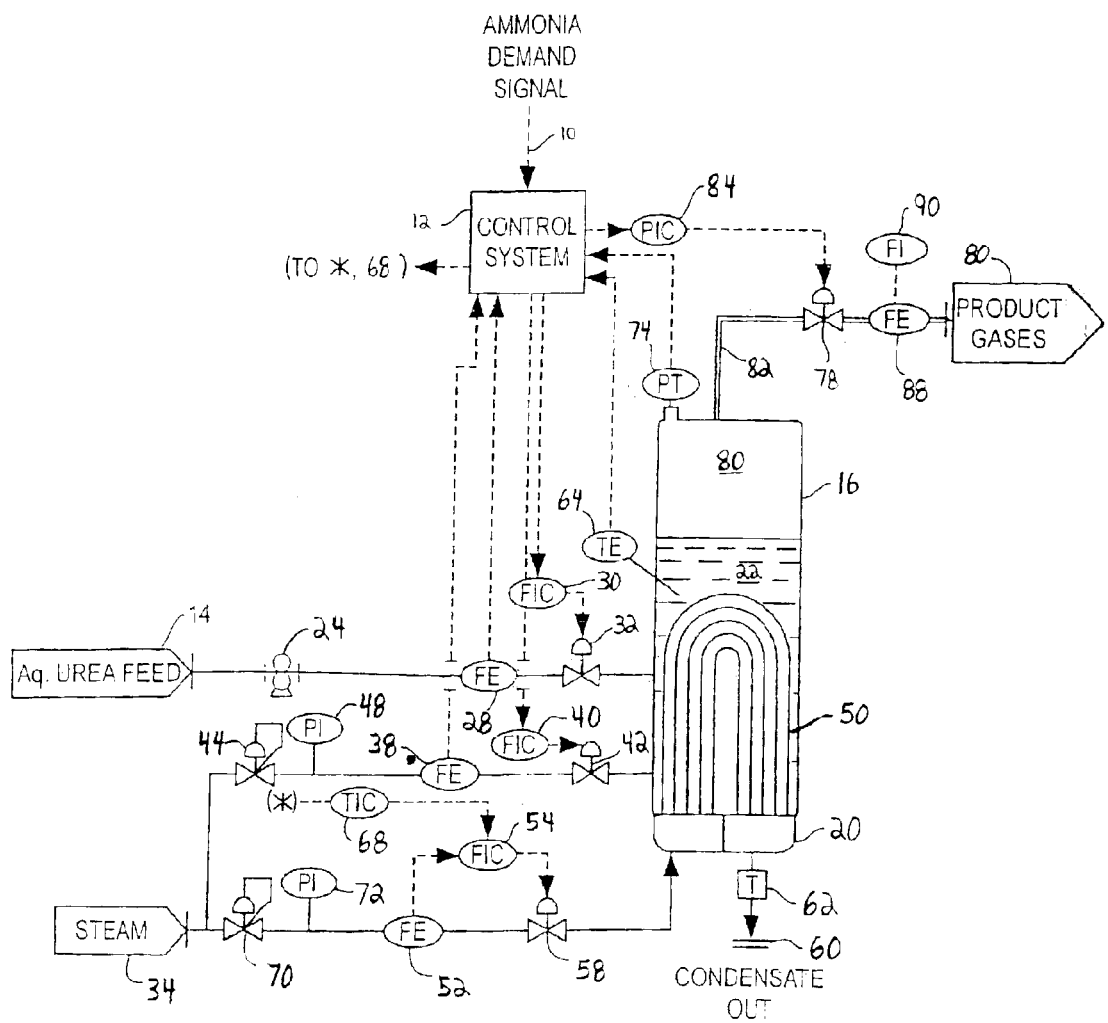
FIG. 4 illustrates an embodiment of a urea hydrolysis apparatus according to the disclosure.

FIG. 4 illustrates an embodiment of a urea hydrolysis apparatus according to the disclosure. In this system, a demand rate signal for ammonia 10 received from an external process can be, for example, proportional to the fuel combustion rate, the concentration of $NO_x$ detected in a flue gas stream in one or more locations, or many other similar measurements that correlate with the demand for ammonia in a process. The ammonia demand rate signal 10 is connected to a urea hydrolysis control system 12 as a primary process control input. Following a change in demand rate signal 10, the control system 12 responds by making a proportional change in input of concentrated aqueous urea 14 and energy (e.g., heat) input to the reactor vessel 16 via a heater 20. Changing the aqueous urea feed rate will bring about a change in the urea concentration of the reaction mixture 22, which in turn changes the reaction rate. After a matter of minutes, the urea concentration will equilibrate and the new reaction rate will equal the demand rate. Maintaining constant temperature and pressure during the change will keep the composition of the catalyst and particularly the water content constant.

In a preferred control system for this embodiment, the ammonia demand rate signal 10 is input to the process controller 12. A supply of concentrated aqueous urea 14 of known and constant concentration is continuously pumped to the reactor in response to the demand rate signal 10 by means of a metering pump 24, a mass flow monitor 28, a mass flow controller 30, and a flow control device, such as a flow control valve 32, that responds to the flow controller 30 output. The demand rate signal 10 provides the set point for the urea flow controller 30, and the flow controller 30 adjusts the flow control valve 32 by monitoring the mass flow delivered to the reactor via the flow monitor 26 to match the requirement.

Process water in the form of steam 34 is supplied in a substantially constant mass ratio to the concentrated aqueous urea 14 mass flow rate using a separate mass flow sensor 38, a flow ratio controller 40, and a flow control valve 42. For practical purposes the process steam line can have a shut off valve 44 and a pressure indicator 48.

Supplemental heat input to the reactants 22 may be effected by means of the heater 20, for example using a tubular heat exchange coil 50 (e.g., electric or with a heat transfer fluid such as steam, as shown in FIG. 4) submerged in or in thermal contact with the liquid reactants 22, as described above. If steam 34 is used, as shown, the heat input is regulated by controlling the flow of steam with a mass flow sensor 52, a flow controller 54 and a flow control valve 58 responding to the ammonia demand signal 10, and a steam condensate outlet 60 is fitted with an appropriate trap 62. A temperature sensor, such as a thermocouple 64, may be used to provide trim control on the reactants 22 temperature with a temperature controller 68. For practical purposes, the steam supply to the heating coil 50 can be fitted with a shut off valve 70 and a pressure indicator 72.

The operating pressure in the reactor vessel 16 is monitored by a pressure transmitter 74, and is changed by a variable restriction device (e.g., a control valve 78) mounted in a product gas (80) discharge pipeline 82 and controlled by a pressure controller 84. In a most preferred embodiment of the invention, such a pressure control valve 78 is operated to maintain a selected substantially constant pressure in the reactor vessel 16 independent of the ammonia demand rate signal 10. Thus, the pressure control valve 78 is normally closed (e.g., when the system is off-line or on stand-by) and is controlled to open as necessary to discharge product gas 80 to maintain a substantially constant pressure in the reactor vessel 16 and in the discharge line 82 immediately upstream (with respect to the gas flow direction) of the control valve 78. Other control sensors for monitoring temperatures, pressures, liquid level of reaction mixture 22, pH of reaction mixture 22, conductivity of reaction mixture 22, product gas 80 mass flow (e.g., a mass flow monitor 88 with a flow indicator 90) or other measurements may be valuable to enhance process control in various ways.

Example 5

Figure 5:
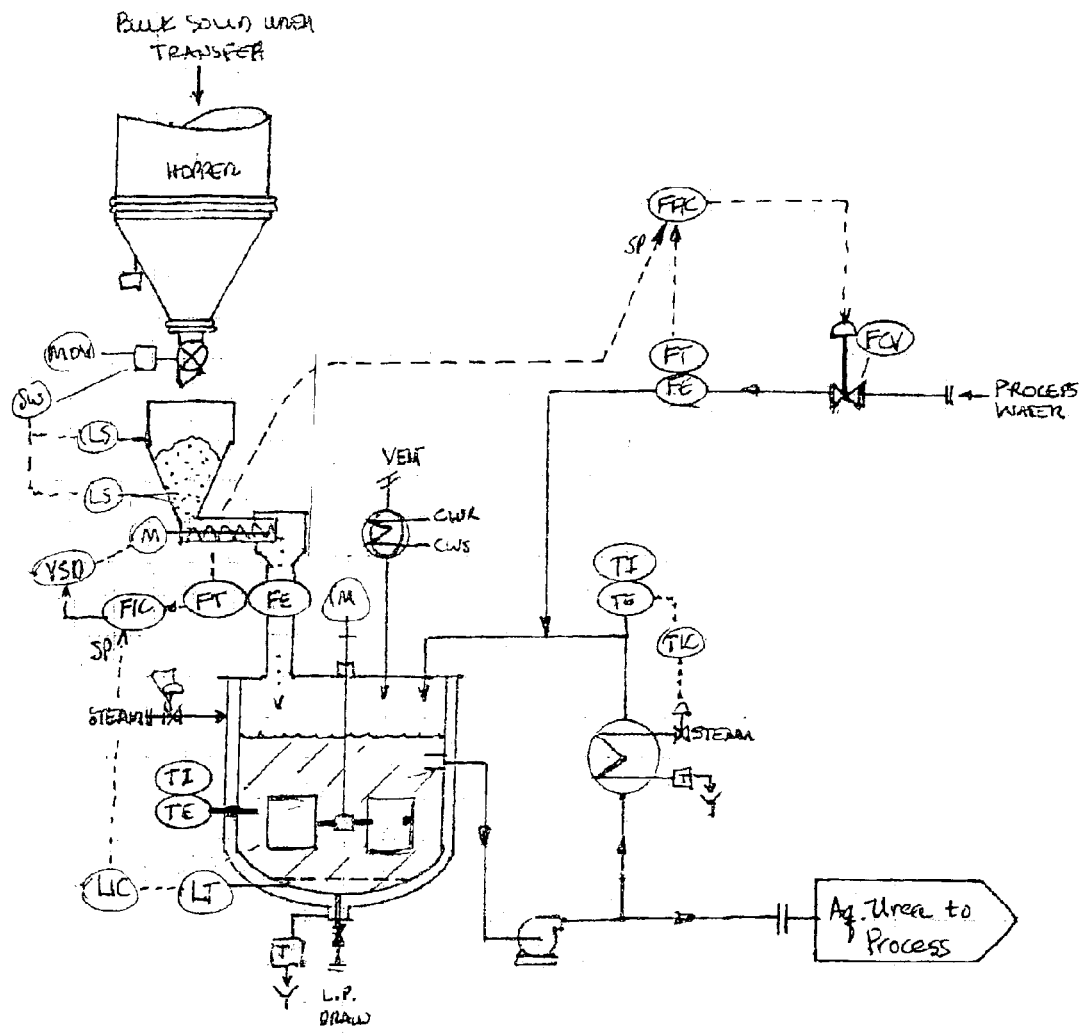
FIG. 5 is an illustration of a continuous granular urea dissolving system for making aqueous urea solutions at a controlled and constant concentration.

FIG. 5 is an illustration of a continuous granular urea dissolving system for making aqueous urea solutions at a controlled and constant concentration by continuous mass flow at a fixed ratio of the solid urea and the process water at a combined rate sufficient to maintain the liquid inventory of aqueous urea solution at a substantially constant volume in an agitated tank mixer. Process heat is supplied through a jacket surrounding the aqueous solution contained in the tank mixer, and can be supplemented by means of a recirculation loop of aqueous urea with a heat exchanger, to heat the contents of the dissolving tank to supply the required heat of solution (endothermic for urea) and any heat necessary to maintain a temperature in the tank greater than the saturation temperature of the concentrated aqueous solution. As aqueous urea solution is drawn from the tank to satisfy the ammonia demand in an external process application, the level sensor transmits a control signal to the flow controller for the solid urea granules (for example) and the mass metering of urea granules commences at a rate proportional to the liquid level differential from the normal, nominally full, liquid level. As solid urea is supplied, its mass flow rate is measured and controlled, and its mass flow transmitter sends a set point signal to a flow ratio controller that governs the addition of the proportional amount of process water.

The mass flow of both urea and water are therefore maintained in a fixed ratio, and the concentration of the aqueous urea solution is therefore determined.

Example 6

Figure 6:
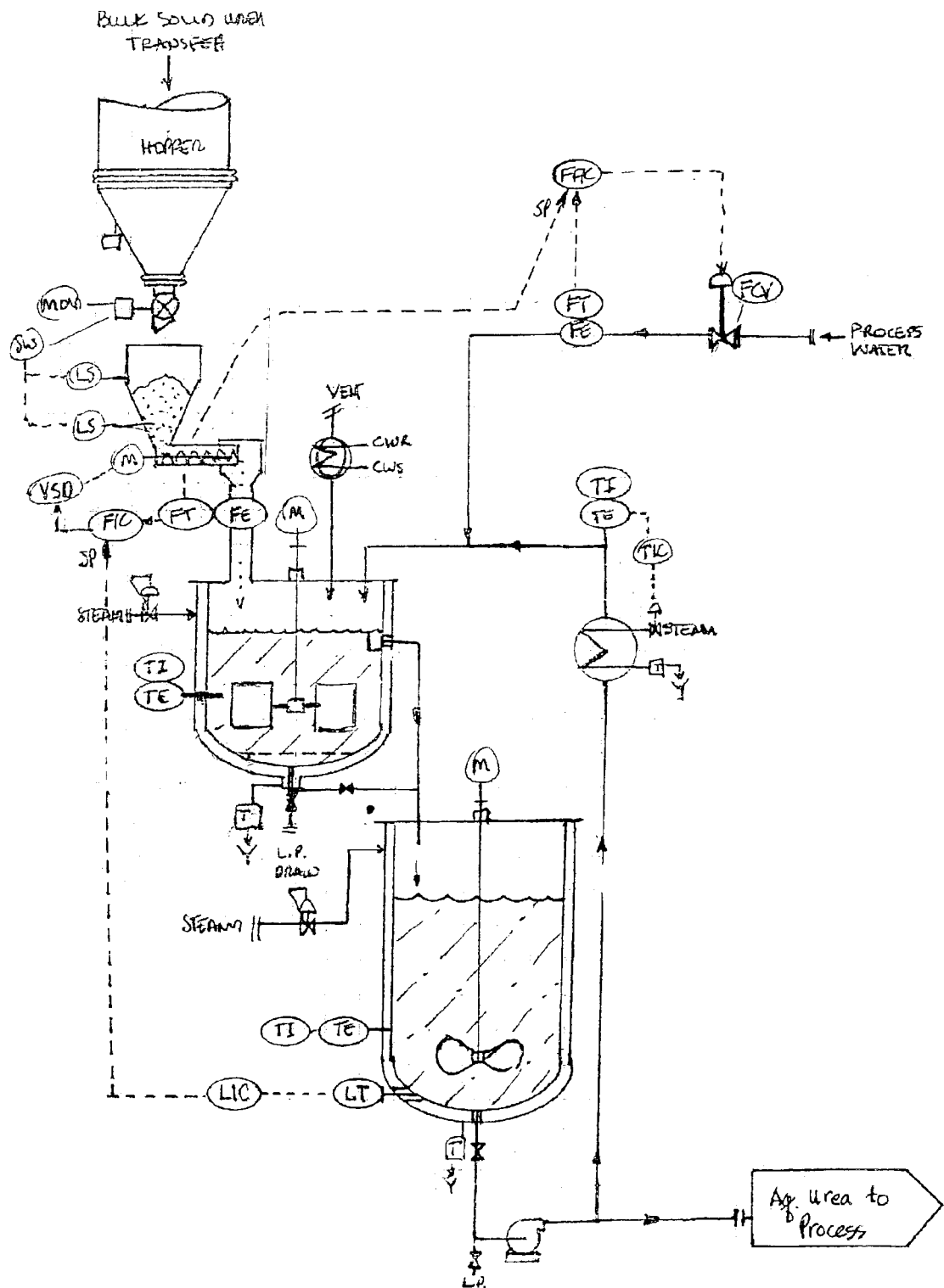
FIG. 6 is an illustration of a continuous urea dissolving system similar to the system described in FIG. 5, except that an additional holding tank is provided to enable the liquid level of the mixing tank to be fixed using an overflow.

FIG. 6 is an illustration of a continuous urea dissolving system similar to the system described in FIG. 5, except that an additional holding tank is provided to enable the liquid level of the mixing tank to be fixed using an overflow. The holding tank is heated to supply the any heat necessary to maintain a temperature in the tank greater than the saturation temperature of the concentrated aqueous solution. The two tanks can be mounted such that the mixing tank can be drained by gravity into the holding tank. The urea hydrolysis process draws from the holding tank, and the liquid level in the holding tank drives the dissolving process control system.

Example 7

Figure 7:
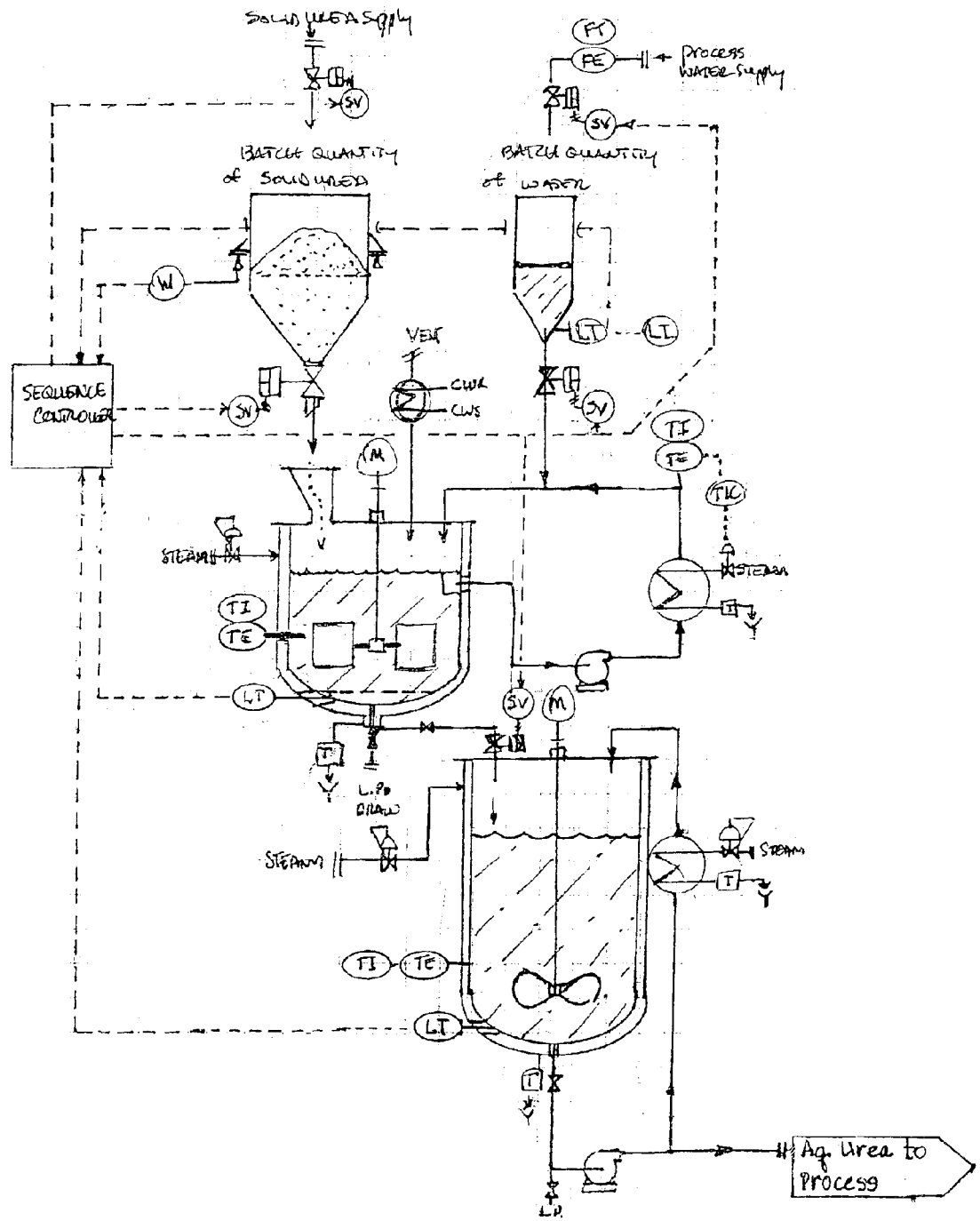
FIG. 7 illustrates a batch urea dissolving system with a mixing tank and a holding tank.

FIG. 7 illustrates a batch urea dissolving system with a mixing tank and a holding tank. In this system, a fixed and weighed mass of solid urea is fed into a mixing tank along with a predetermined charge of process water. The mixing tank can be operated with a heel of aqueous urea of the desired concentration, in which case it is preferably heated to supply any heat necessary to maintain a temperature in the tank greater than its saturation temperature. A batch sequence controller is provided to step the batch process through a standard cycle. When the liquid level in the holding tank falls to a preset level, a level switch activates a batching sequence. First, the aqueous urea solution held in the mixing tank is drained into the holding tank, in whole or in part. The holding tank is preferably heated to supply any heat necessary to maintain a temperature in the tank greater than its saturation temperature. Next, the batch of solid urea and process water are charged into the mixing tank, and the mixture is heated and agitated until the urea is dissolved and the solution reaches the desired temperature.

The foregoing description is given for clearness of understanding only, and no unnecessary limitations should be understood therefrom, as modifications within the scope of the invention may be apparent to those having ordinary skill in the art.

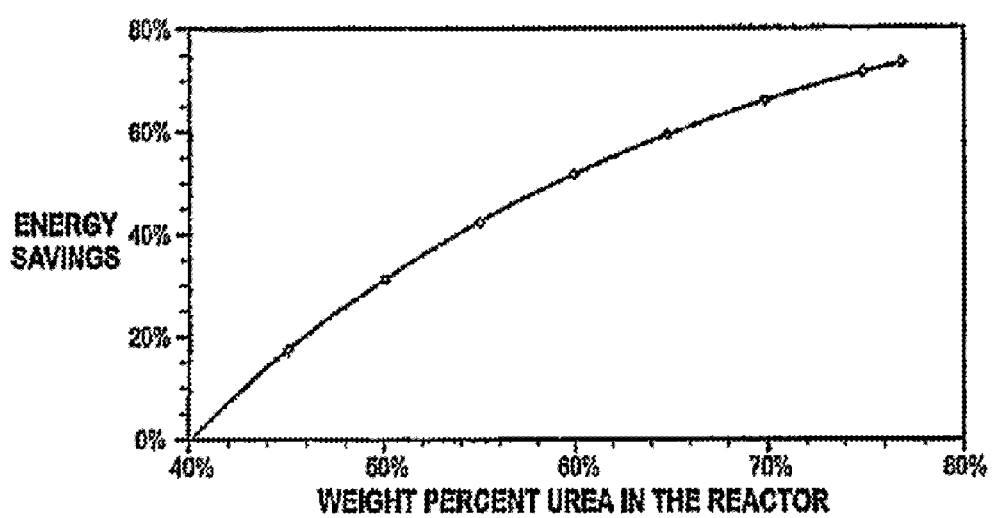

What is claimed is:

1. A method of continuously, quantitatively producing gaseous ammonia from urea, comprising the steps of:
    dissolving urea in water to form concentrated aqueous urea comprising at least 77 wt. % urea;
    continuously feeding said concentrated aqueous urea into a reactor;
    continuously feeding a separate, additional supply of water into said reactor to form an aqueous urea reaction mixture;
    heating the aqueous urea reaction mixture to hydrolyze the urea; and
    withdrawing a gas phase product comprising ammonia from said reactor.

2. The method of claim 1, wherein said concentrated aqueous urea comprises greater than 77 wt. % urea.

3. The method of claim 1, wherein said concentrated aqueous urea comprises at least 80 wt. % urea.

4. The method of claim 1, wherein said concentrated aqueous urea comprises 88 wt. % or less urea.

5. The method of claim 1, wherein said additional supply of water is in the form of steam.

6. The method of claim 1, comprising continuously feeding at least one mole of water per mole of urea to said reactor by said concentrated aqueous urea feed and said separate supply of water.

7. The method of claim 6, wherein the mass ratio of water to urea fed to the reactor is 1 or less.

8. The method of claim 7, wherein the mass ratio of water to urea fed to the reactor is less than 0.82.

9. The method of claim 8, wherein the mass ratio of water to urea fed to the reactor is less than 0.67.

10. The method of claim 9, wherein the mass ratio of water to urea in said reaction mixture is less than 0.54.

11. The method of claim 1, further comprising a step of adding a catalyst to one or more of said concentrated aqueous urea feed and said reactor.

12. The method of claim 11, wherein said catalyst is selected from the group consisting of polyprotic acids, animonium salts of polyprotic acids, and mixtures thereof.

13. The method of claim 12, wherein said catalyst is selected from the group consisting of phosphoric acid, monoammonium dihydrogen phosphate, diammonium hydrogen phosphate, and combinations thereof.

14. The method of claim 13, comprising heating said aqueous urea in said reactor to maintain a temperature in said reactor in a range of about 155° C. to about 175° C., regardless of change in a demand for ammonia.

15. The method of claim 14, further comprising the step of withdrawing said gas phase products to maintain a pressure in said reactor in a range of about 80 psig to about 200 psig, regardless of change in a demand for ammonia.

16. The method of claim 15, comprising the steps of controlling the temperature to a constant set point and controlling the pressure to a constant set point.

17. The method of claim 1, further comprising the step of feeding said gaseous stream comprising ammonia to a flue gas conditioning apparatus.

18. The method of claim 1, further comprising storing said concentrated aqueous urea before feeding it into said reactor.

19. The method of claim 18, further comprising heating said stored concentrated aqueous urea to a temperature greater than its saturation temperature and less than about 140° C.

20. A method of continuously, quantitatively producing gaseous ammonia from urea, comprising the steps of:
    dissolving urea in water to form concentrated aqueous urea comprising at least 77 wt. % urea;
    storing at least a portion of said concentrated aqueous urea solution at a temperature greater than its saturation temperature and less than about 140° C.;
    continuously feeding said concentrated aqueous urea into a reactor;
    continuously feeding a separate, additional supply of water into said reactor to form a reaction mixture comprising at least one mole of water per mole of urea in said reactor;
    heating the aqueous urea reaction mixture to a constant temperature in a range of about 155° C. to about 175° C. to hydrolyze the urea; and
    withdrawing a gas phase product comprising ammonia from said reactor to maintain a constant pressure in said reactor in a range of about 80 psig to about 200 psig.

* * * * *

UNITED STATES PATENT AND TRADEMARK OFFICE
CERTIFICATE OF CORRECTION

| | |
|---|---|
| PATENT NO. | : 6,887,449 B2 |
| APPLICATION NO. | : 10/302531 |
| DATED | : May 3, 2005 |
| INVENTOR(S) | : Brooks et al. |

It is certified that error appears in the above-identified patent and that said Letters Patent is hereby corrected as shown below:

Title page, Abstract, line 6, "additional supply water" should be --additional supply of water--.

In the drawings, Figure 1 should appear as shown below:

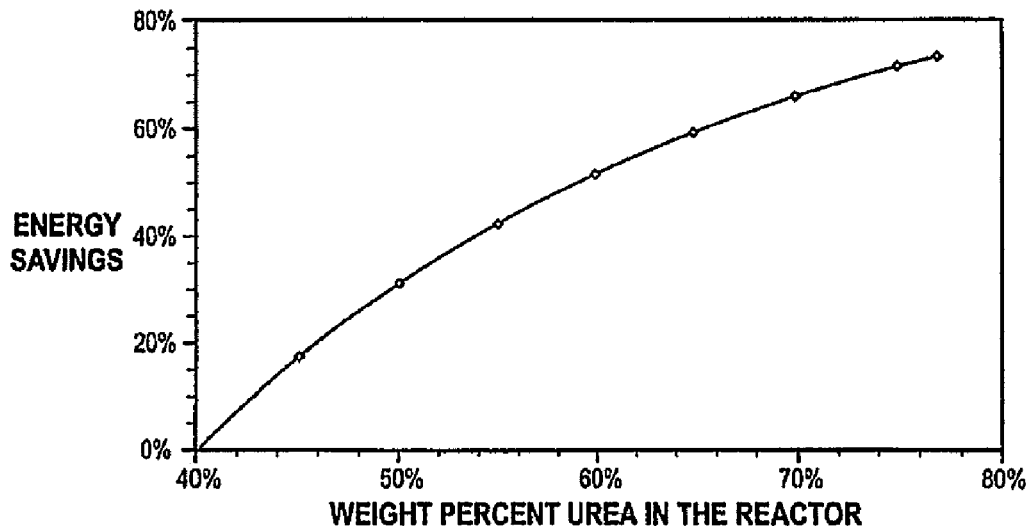

UNITED STATES PATENT AND TRADEMARK OFFICE
CERTIFICATE OF CORRECTION

PATENT NO.       : 6,887,449 B2
APPLICATION NO.  : 10/302531
DATED            : May 3, 2005
INVENTOR(S)      : Brooks et al.

It is certified that error appears in the above-identified patent and that said Letters Patent is hereby corrected as shown below:

In the drawings, Figure 2 should appear as shown below:

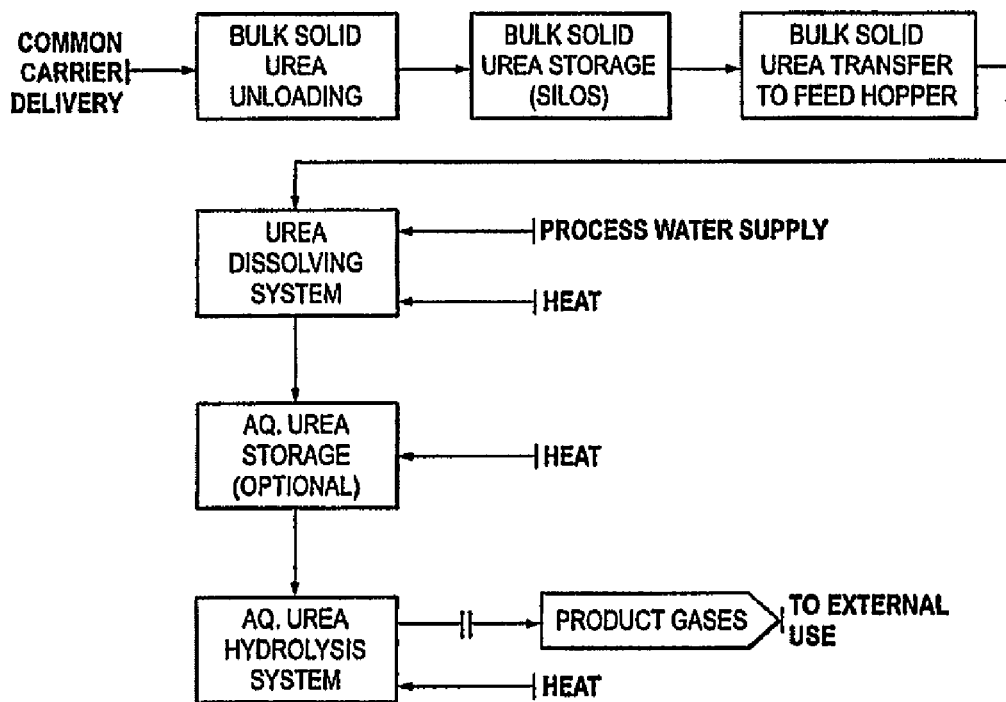

UNITED STATES PATENT AND TRADEMARK OFFICE
CERTIFICATE OF CORRECTION

| | | |
|---|---|---|
| PATENT NO. | : 6,887,449 B2 | |
| APPLICATION NO. | : 10/302531 | |
| DATED | : May 3, 2005 | |
| INVENTOR(S) | : Brooks et al. | |

Figure 3:
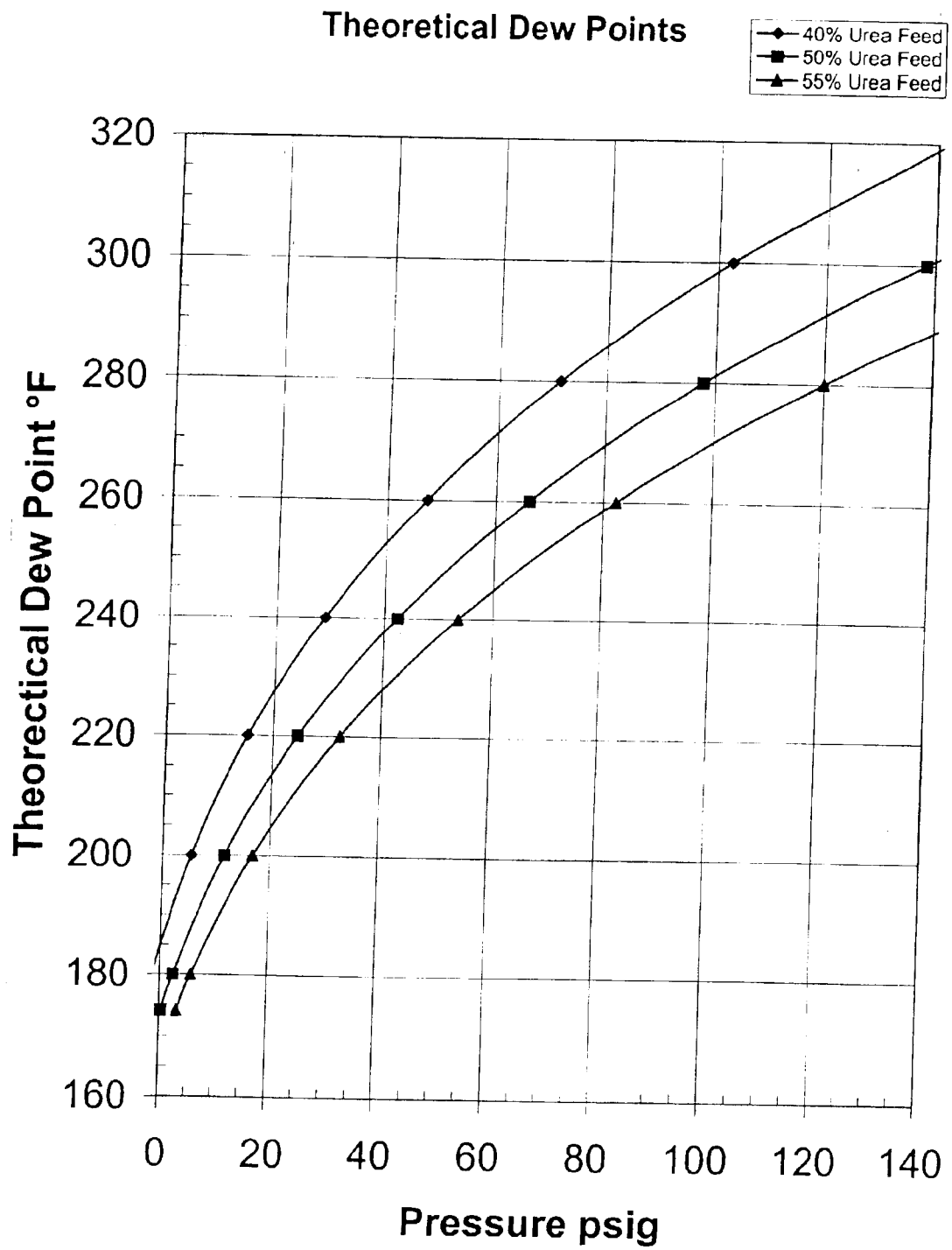
FIG. 3 is a plot of calculated dew point temperatures as a function of pressure for 40 wt. %, 50 wt. %, and 55 wt. % urea solutions.

It is certified that error appears in the above-identified patent and that said Letters Patent is hereby corrected as shown below:

In the drawings, Figure 3 should appear as shown below:

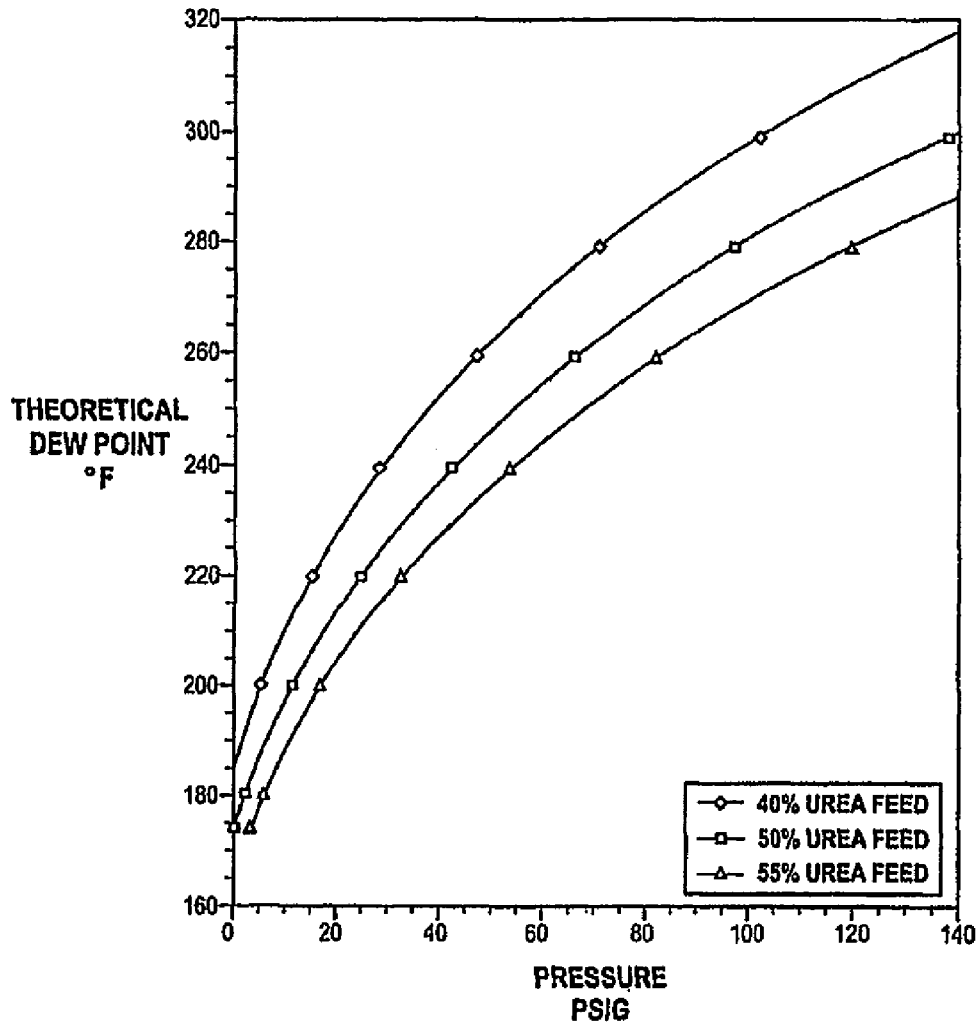

UNITED STATES PATENT AND TRADEMARK OFFICE
CERTIFICATE OF CORRECTION

PATENT NO. : 6,887,449 B2  
APPLICATION NO. : 10/302531  
DATED : May 3, 2005  
INVENTOR(S) : Brooks et al.

Page 4 of 7

It is certified that error appears in the above-identified patent and that said Letters Patent is hereby corrected as shown below:

In the drawings, Figure 4 should appear as shown below:

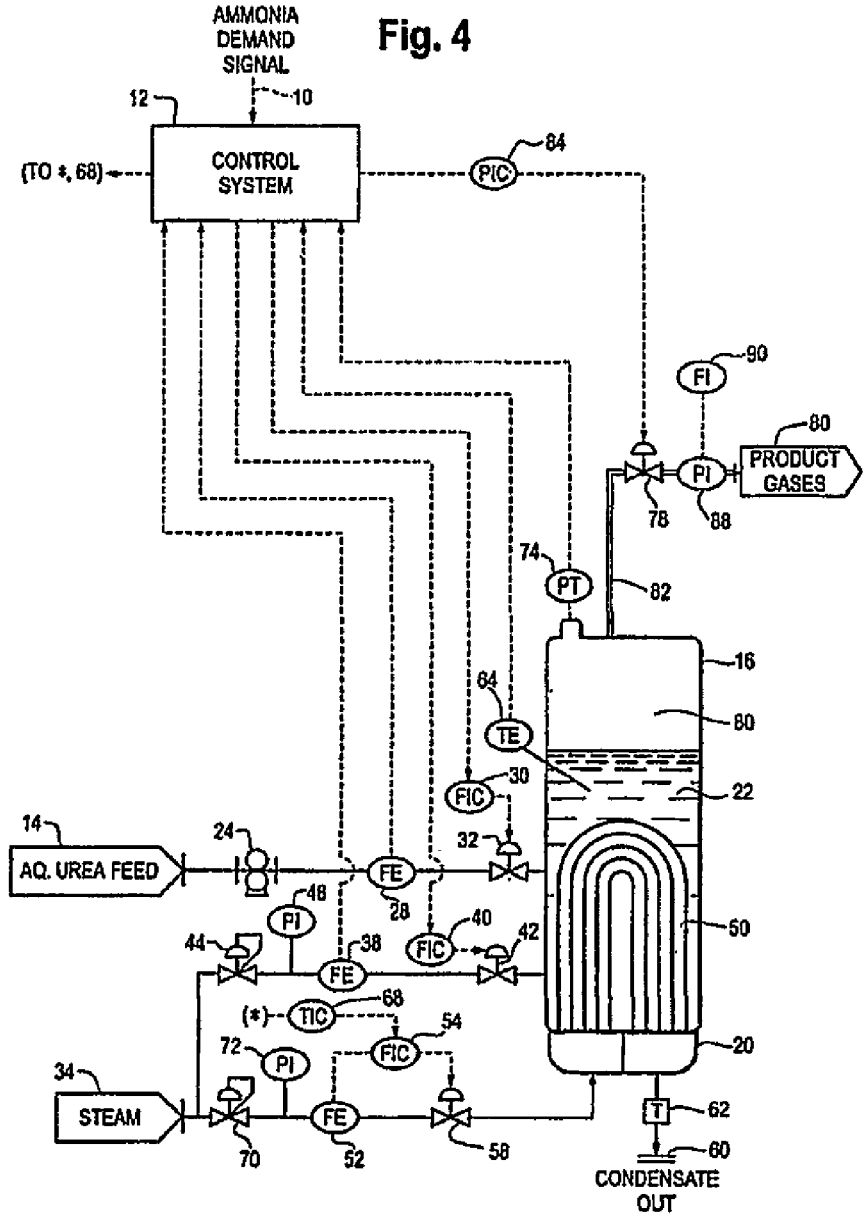

UNITED STATES PATENT AND TRADEMARK OFFICE
CERTIFICATE OF CORRECTION

PATENT NO. : 6,887,449 B2  Page 5 of 7
APPLICATION NO. : 10/302531
DATED : May 3, 2005
INVENTOR(S) : Brooks et al.

It is certified that error appears in the above-identified patent and that said Letters Patent is hereby corrected as shown below:

In the drawings, Figure 5 should appear as shown below:

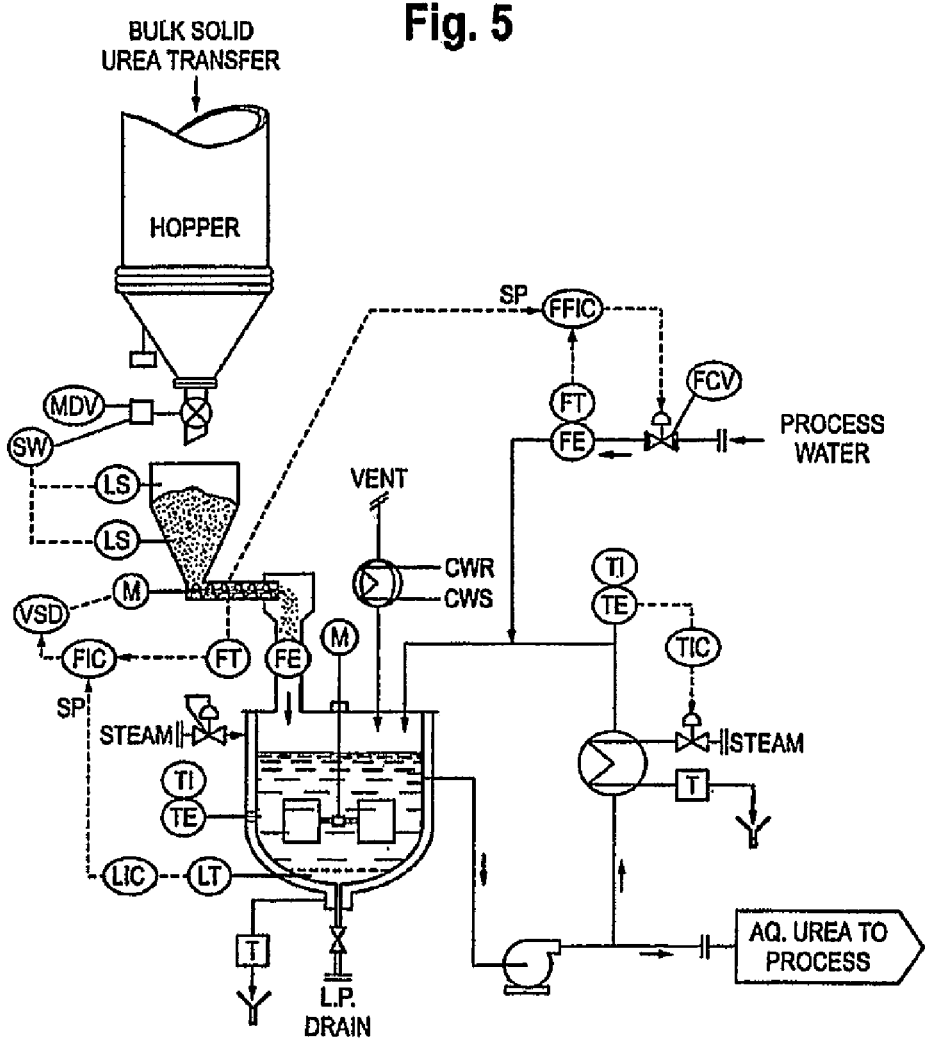

Fig. 5

UNITED STATES PATENT AND TRADEMARK OFFICE
CERTIFICATE OF CORRECTION

| | |
|---|---|
| PATENT NO. | : 6,887,449 B2 |
| APPLICATION NO. | : 10/302531 |
| DATED | : May 3, 2005 |
| INVENTOR(S) | : Brooks et al. |

It is certified that error appears in the above-identified patent and that said Letters Patent is hereby corrected as shown below:

In the drawings, Figure 6 should appear as shown below:

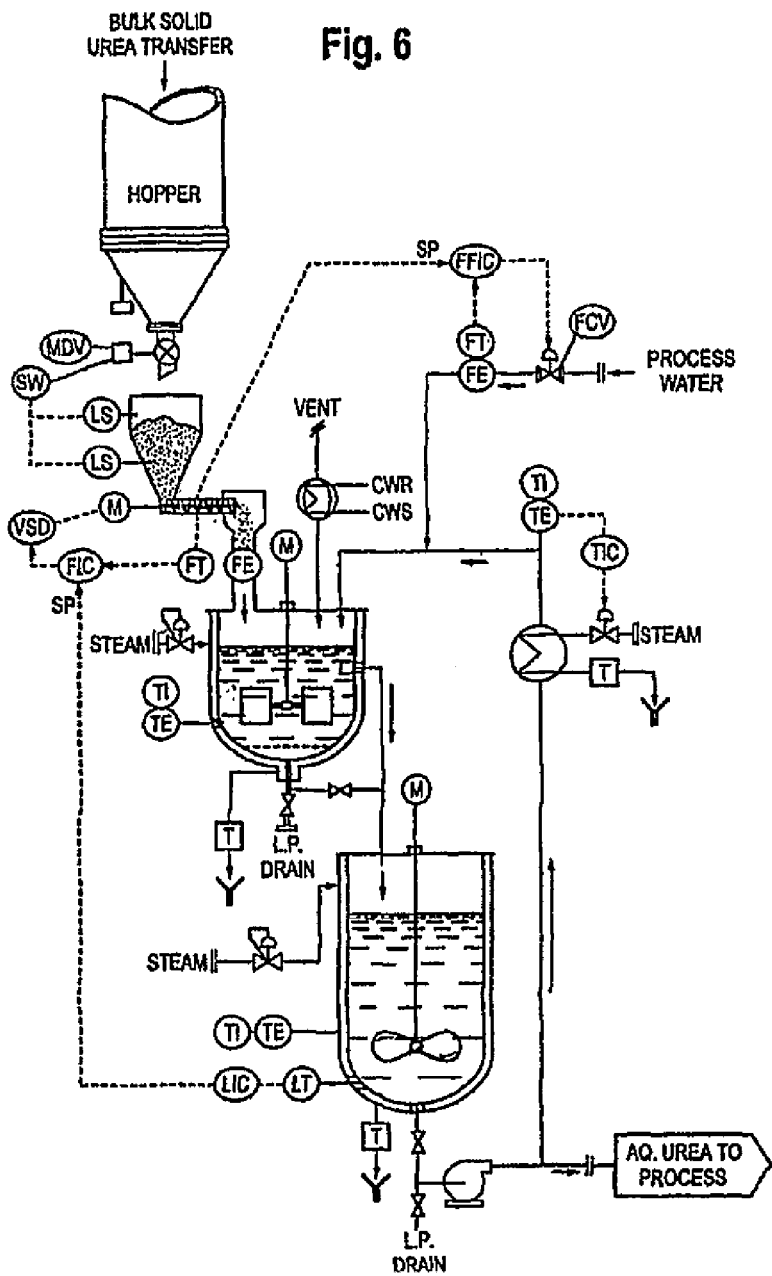

UNITED STATES PATENT AND TRADEMARK OFFICE
CERTIFICATE OF CORRECTION

PATENT NO. : 6,887,449 B2
APPLICATION NO. : 10/302531
DATED : May 3, 2005
INVENTOR(S) : Brooks et al.

It is certified that error appears in the above-identified patent and that said Letters Patent is hereby corrected as shown below:

In the drawings, Figure 7 appear as shown below:

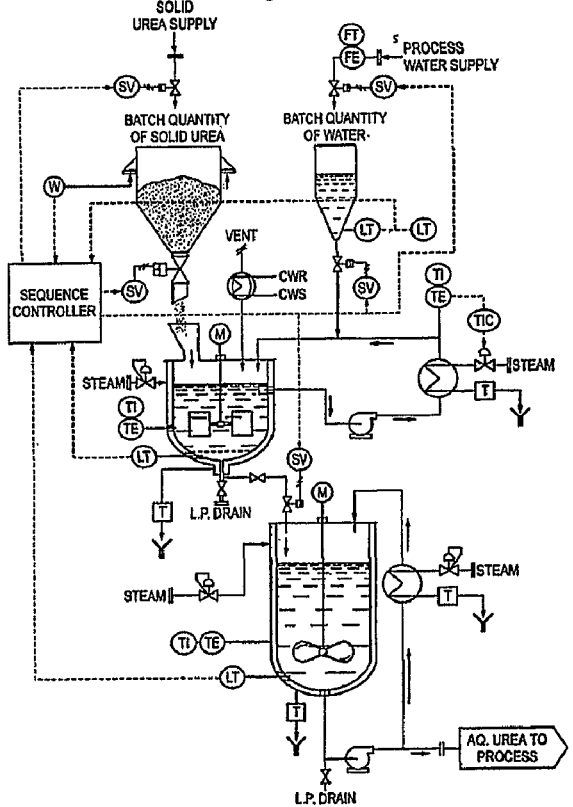

Fig. 7

Column 12, line 19, "animonium" should be --ammonium--.

Signed and Sealed this

Twenty-eighth Day of August, 2007

JON W. DUDAS
*Director of the United States Patent and Trademark Office*

UNITED STATES PATENT AND TRADEMARK OFFICE
CERTIFICATE OF CORRECTION

PATENT NO. : 6,887,449 B2
APPLICATION NO. : 10/302531
DATED : May 3, 2005
INVENTOR(S) : Brooks et al.

It is certified that error appears in the above-identified patent and that said Letters Patent is hereby corrected as shown below:

Title page, Abstract, line 6, "additional supply water" should be --additional supply of water--.

Column 12, line 19, "animonium" should be --ammonium--.

In the drawings, Figure 1 should appear as shown below:

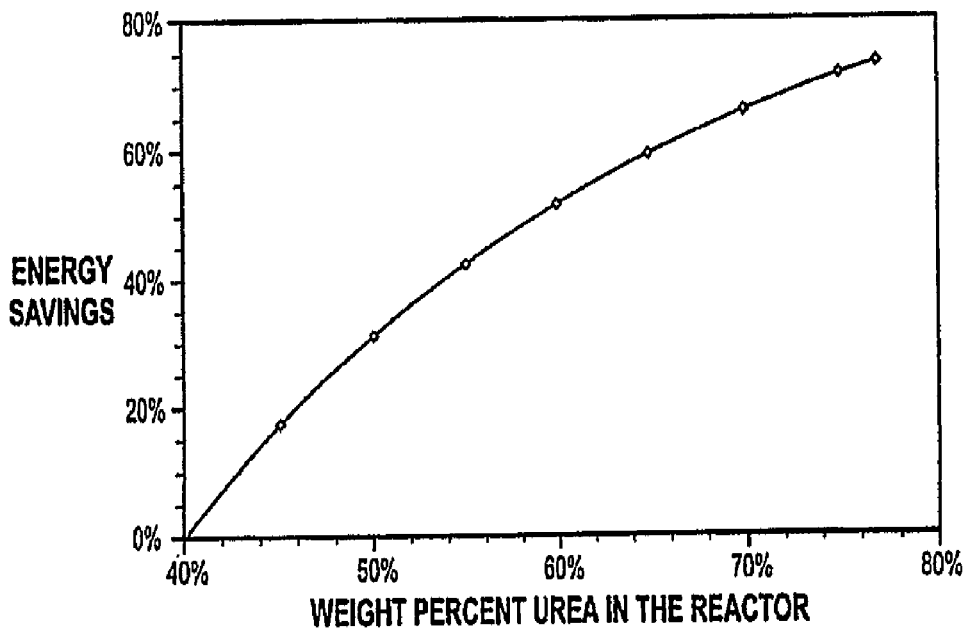

UNITED STATES PATENT AND TRADEMARK OFFICE
CERTIFICATE OF CORRECTION

| | |
|---|---|
| PATENT NO. | : 6,887,449 B2 |
| APPLICATION NO. | : 10/302531 |
| DATED | : May 3, 2005 |
| INVENTOR(S) | : Brooks et al. |

It is certified that error appears in the above-identified patent and that said Letters Patent is hereby corrected as shown below:

In the drawings, Figure 2 should appear as shown below:

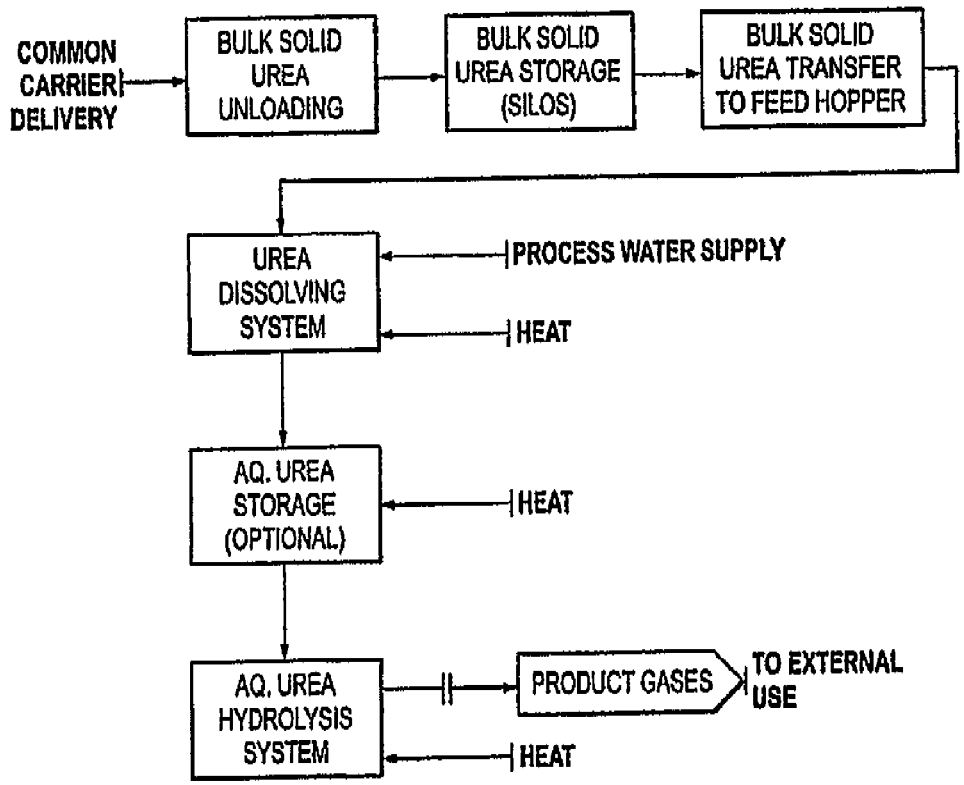

UNITED STATES PATENT AND TRADEMARK OFFICE
CERTIFICATE OF CORRECTION

PATENT NO. : 6,887,449 B2
APPLICATION NO. : 10/302531
DATED : May 3, 2005
INVENTOR(S) : Brooks et al.

It is certified that error appears in the above-identified patent and that said Letters Patent is hereby corrected as shown below:

In the drawings, Figure 3 should appear as shown below:

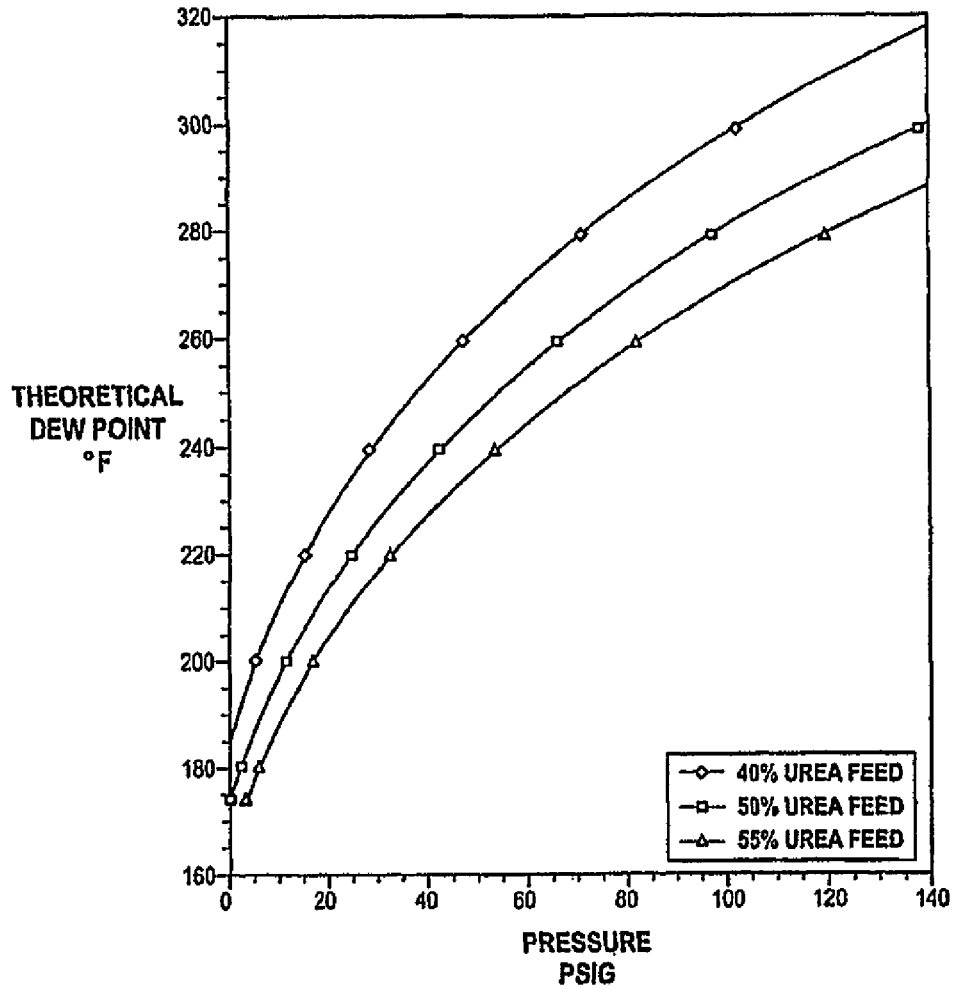

UNITED STATES PATENT AND TRADEMARK OFFICE
CERTIFICATE OF CORRECTION

PATENT NO. : 6,887,449 B2
APPLICATION NO. : 10/302531
DATED : May 3, 2005
INVENTOR(S) : Brooks et al.

It is certified that error appears in the above-identified patent and that said Letters Patent is hereby corrected as shown below:

In the drawings, Figure 4 should appear as shown below:

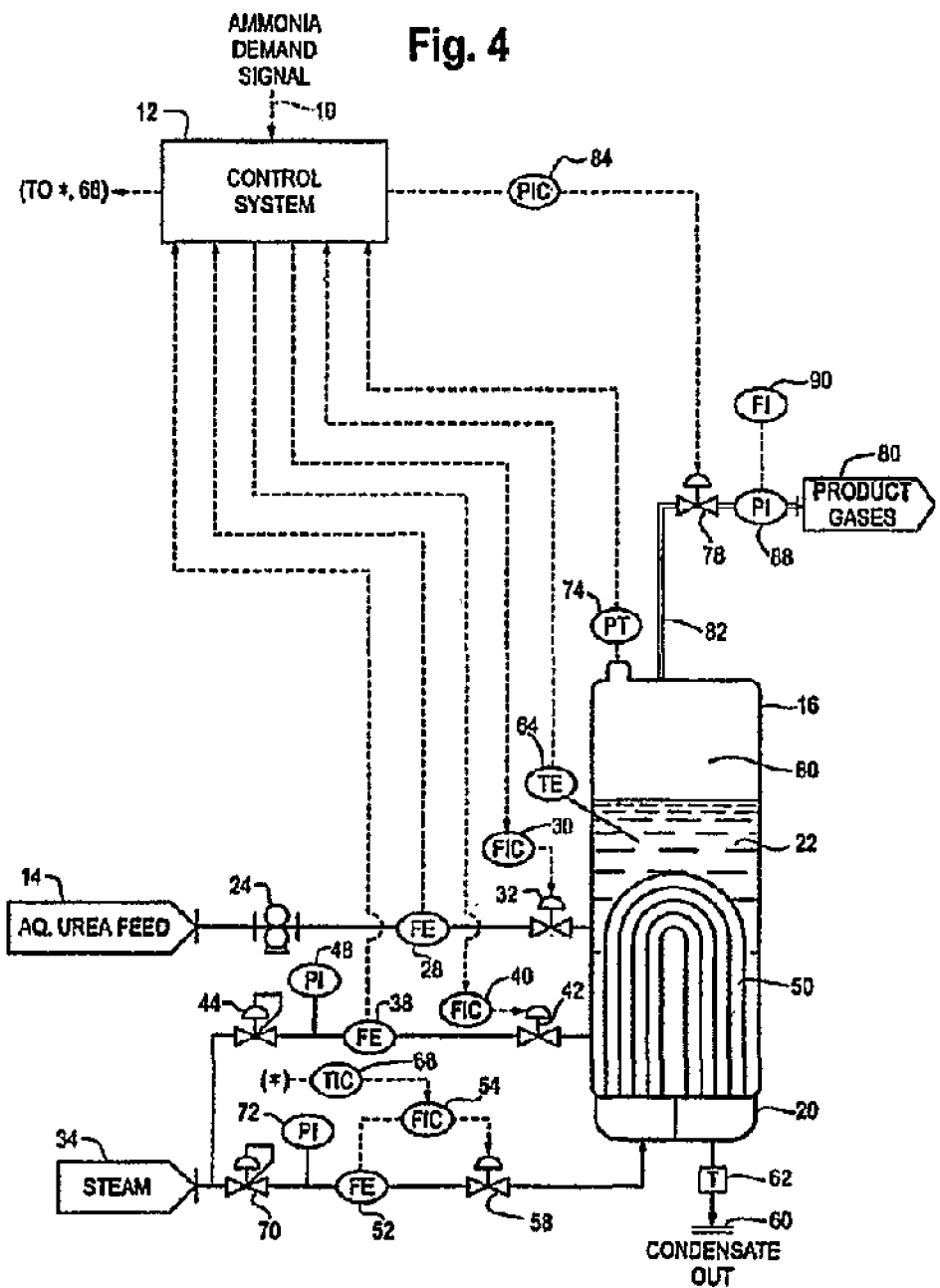

UNITED STATES PATENT AND TRADEMARK OFFICE
CERTIFICATE OF CORRECTION

PATENT NO.       : 6,887,449 B2                                              Page 5 of 7
APPLICATION NO.  : 10/302531
DATED            : May 3, 2005
INVENTOR(S)      : Brooks et al.

It is certified that error appears in the above-identified patent and that said Letters Patent is hereby corrected as shown below:

In the drawings, Figure 5 should appear as shown below:

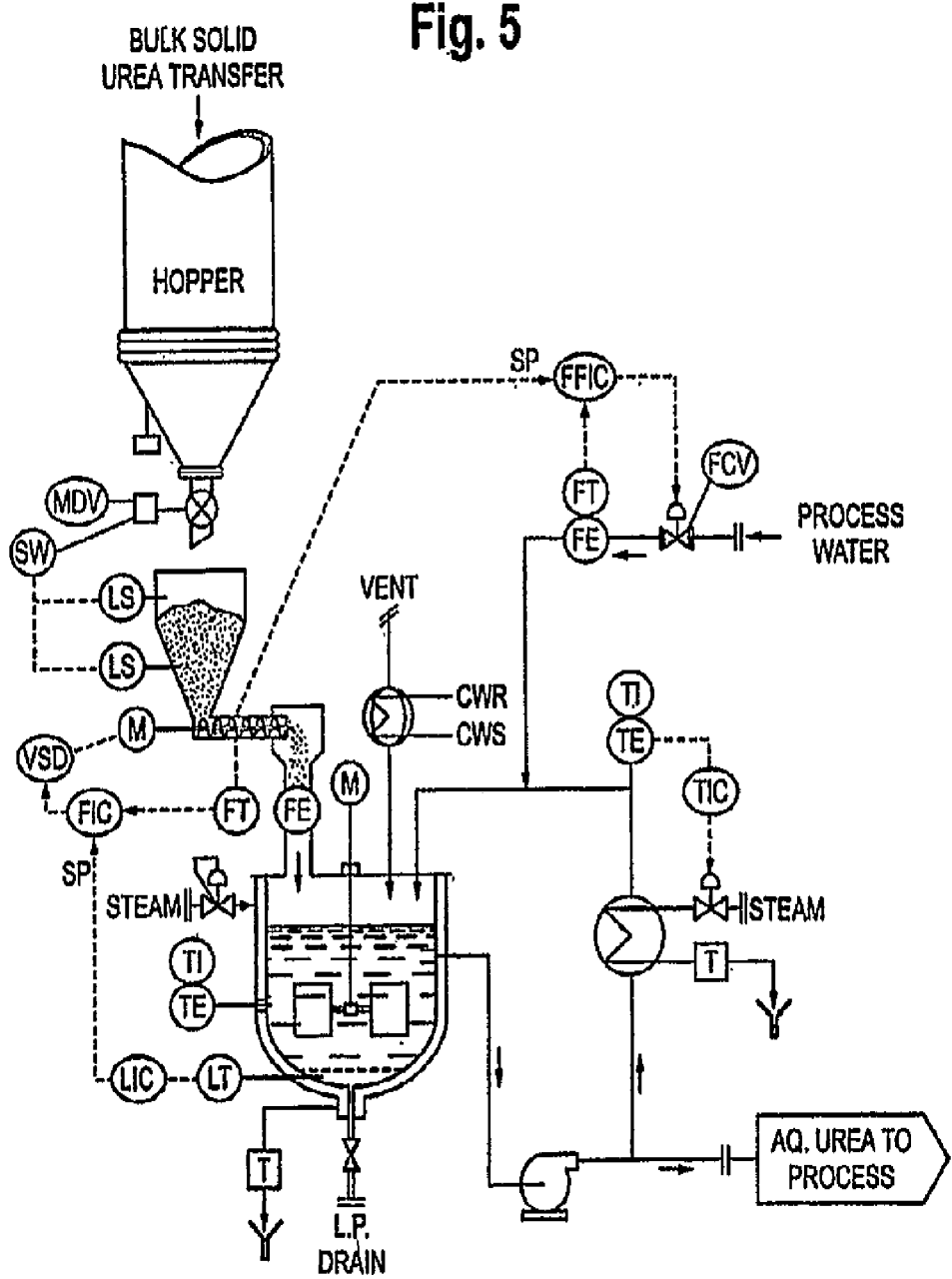

UNITED STATES PATENT AND TRADEMARK OFFICE
CERTIFICATE OF CORRECTION

PATENT NO. : 6,887,449 B2  
APPLICATION NO. : 10/302531  
DATED : May 3, 2005  
INVENTOR(S) : Brooks et al.

It is certified that error appears in the above-identified patent and that said Letters Patent is hereby corrected as shown below:

In the drawings, Figure 6 should appear as shown below:

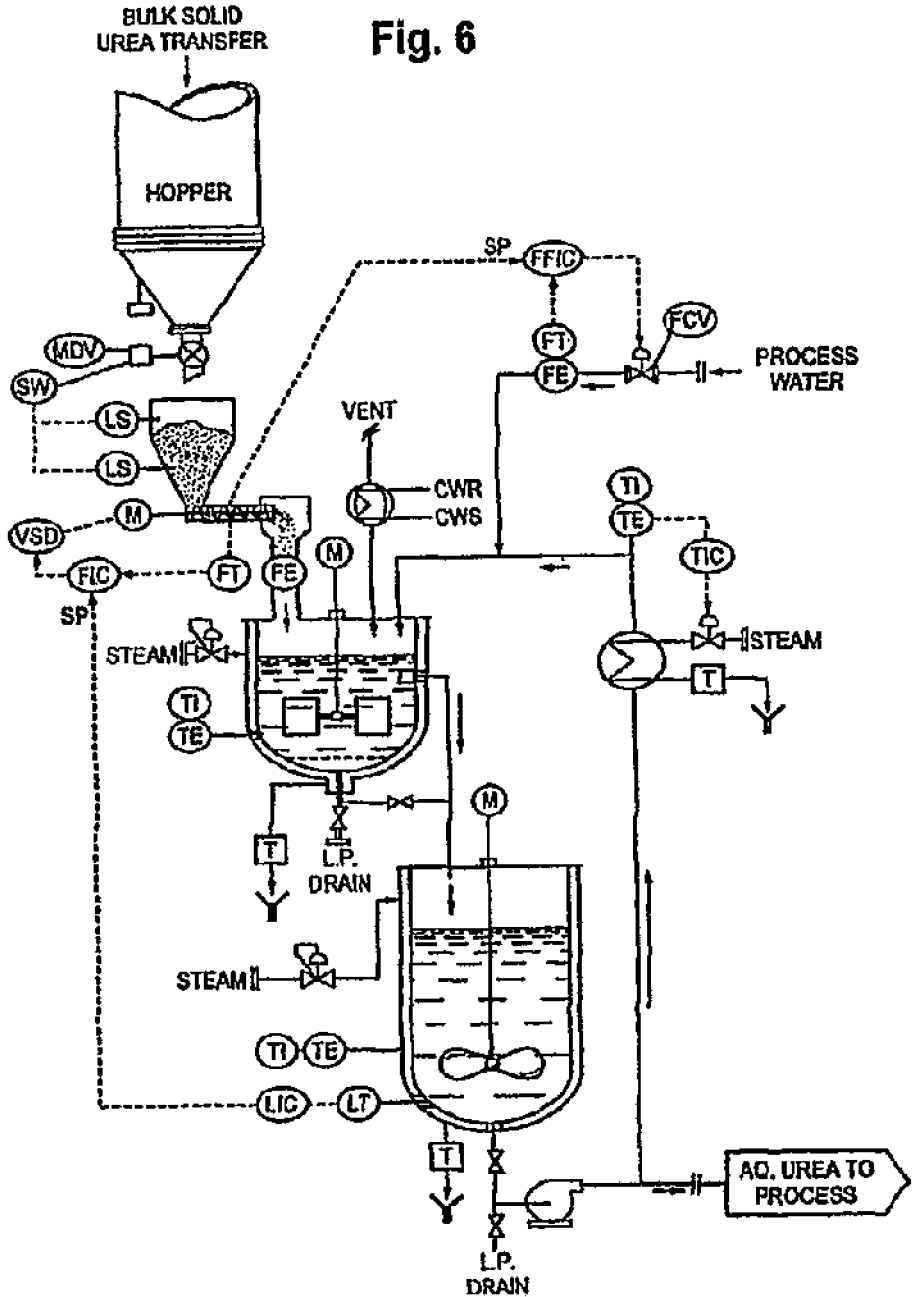

UNITED STATES PATENT AND TRADEMARK OFFICE
CERTIFICATE OF CORRECTION

PATENT NO.        : 6,887,449 B2
APPLICATION NO. : 10/302531
DATED             : May 3, 2005
INVENTOR(S)       : Brooks et al.

It is certified that error appears in the above-identified patent and that said Letters Patent is hereby corrected as shown below:

In the drawings, Figure 7 should appear as shown below:

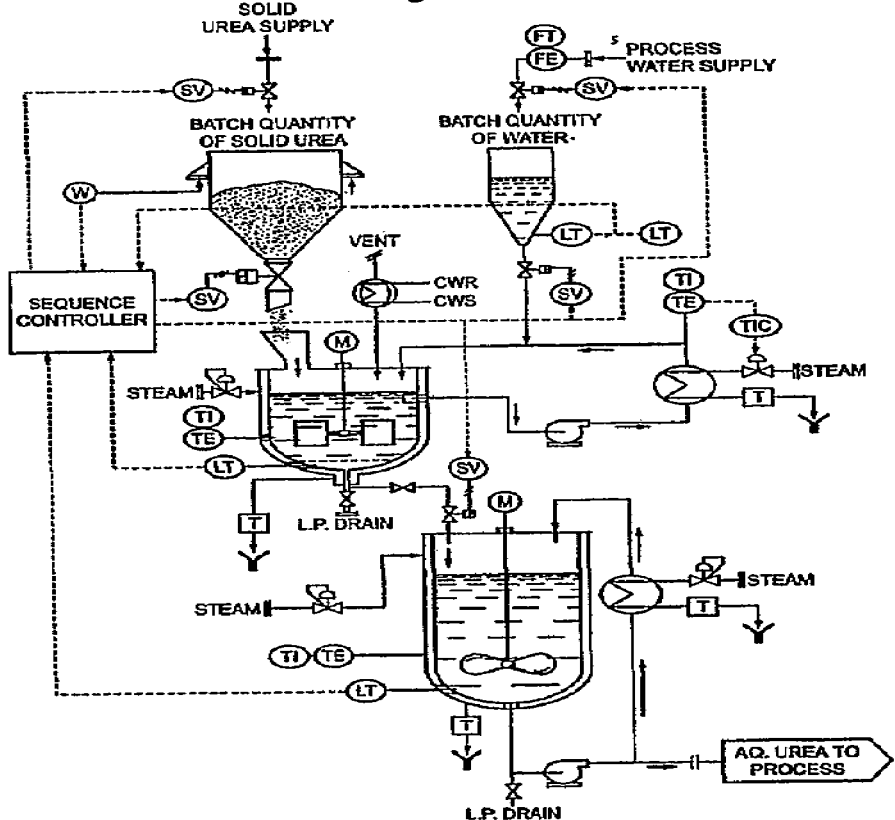

Signed and Sealed this

Fourth Day of September, 2007

JON W. DUDAS
*Director of the United States Patent and Trademark Office*

UNITED STATES PATENT AND TRADEMARK OFFICE
CERTIFICATE OF CORRECTION

PATENT NO.         : 6,887,449 B2
APPLICATION NO. : 10/302531
DATED                 : May 3, 2005
INVENTOR(S)       : Brooks et al.

It is certified that error appears in the above-identified patent and that said Letters Patent is hereby corrected as shown below:

Delete the title page and substitute therefor the attached title page.

Title page, Abstract, line 6, "additional supply water" should be --additional supply of water--.

In the drawings, Figure 1 should appear as shown below:

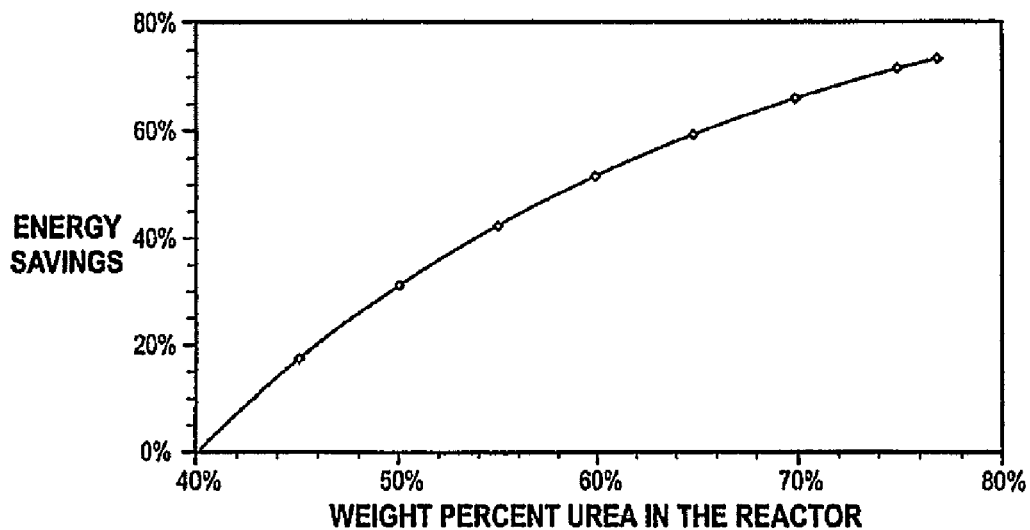

UNITED STATES PATENT AND TRADEMARK OFFICE
CERTIFICATE OF CORRECTION

PATENT NO.        : 6,887,449 B2
APPLICATION NO. : 10/302531
DATED              : May 3, 2005
INVENTOR(S)      : Brooks et al.

It is certified that error appears in the above-identified patent and that said Letters Patent is hereby corrected as shown below:

In the drawings, Figure 2 should appear as shown below:

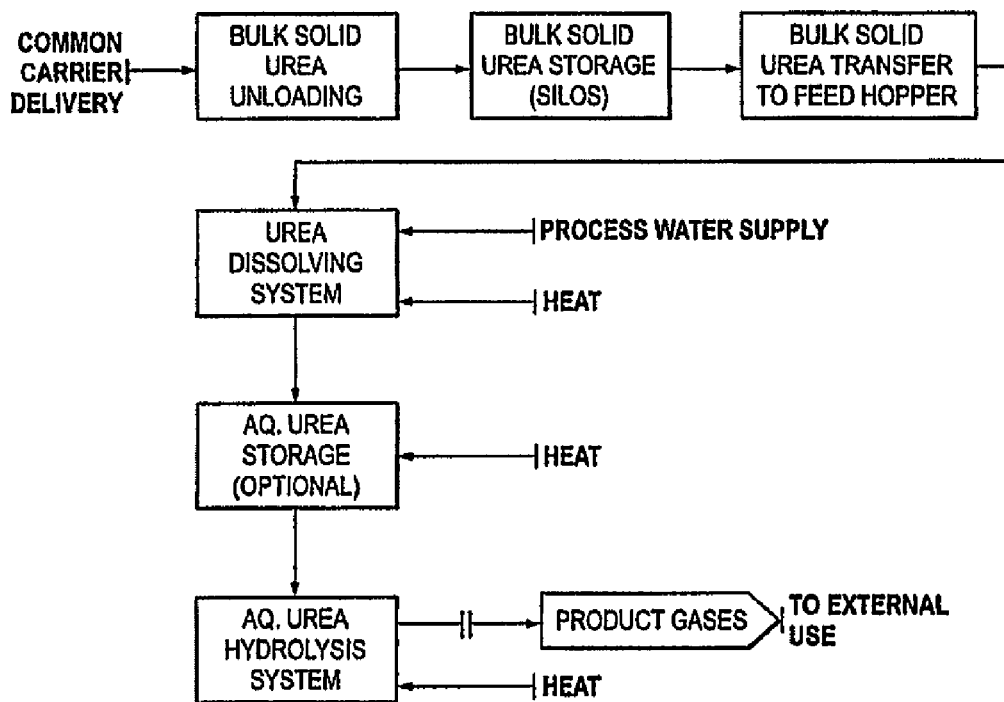

UNITED STATES PATENT AND TRADEMARK OFFICE
CERTIFICATE OF CORRECTION

| | |
|---|---|
| PATENT NO. | : 6,887,449 B2 |
| APPLICATION NO. | : 10/302531 |
| DATED | : May 3, 2005 |
| INVENTOR(S) | : Brooks et al. |

It is certified that error appears in the above-identified patent and that said Letters Patent is hereby corrected as shown below:

In the drawings, Figure 3 should appear as shown below:

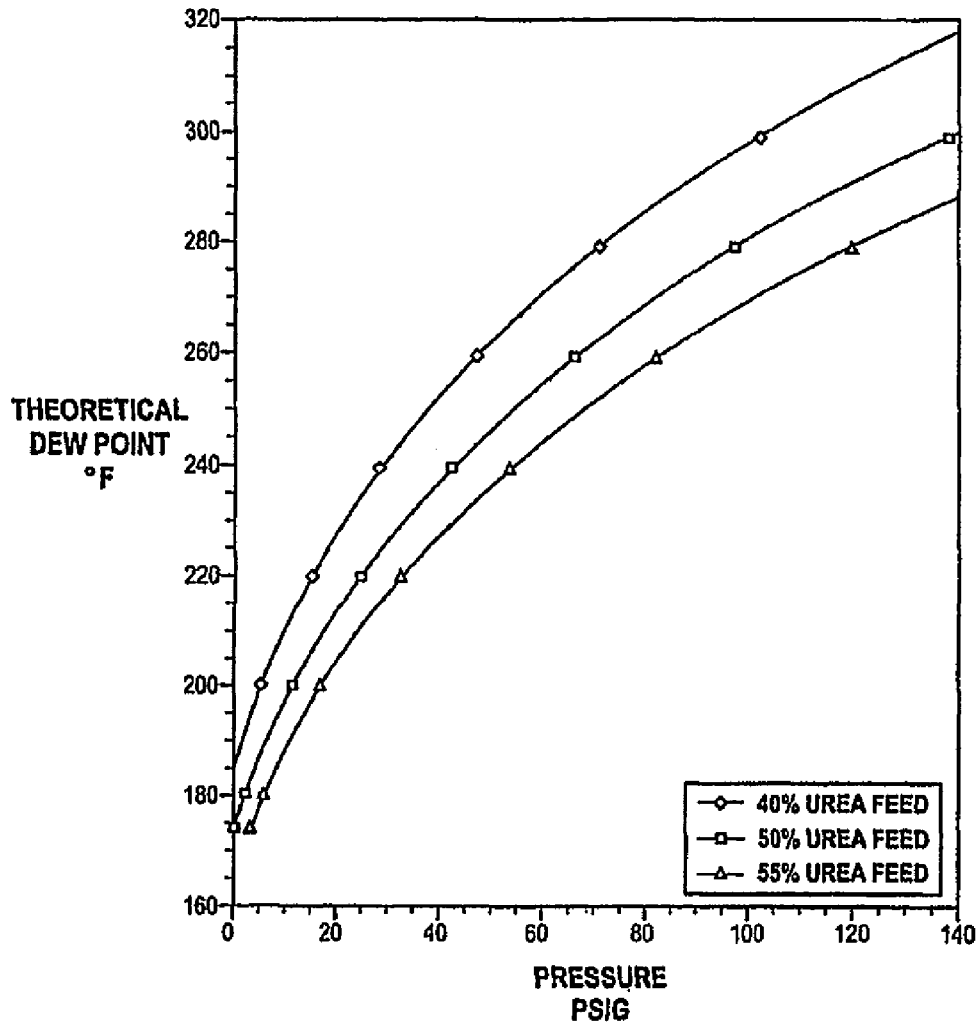

UNITED STATES PATENT AND TRADEMARK OFFICE
CERTIFICATE OF CORRECTION

| | |
|---|---|
| PATENT NO. | : 6,887,449 B2 |
| APPLICATION NO. | : 10/302531 |
| DATED | : May 3, 2005 |
| INVENTOR(S) | : Brooks et al. |

It is certified that error appears in the above-identified patent and that said Letters Patent is hereby corrected as shown below:

In the drawings, Figure 4 should appear as shown below:

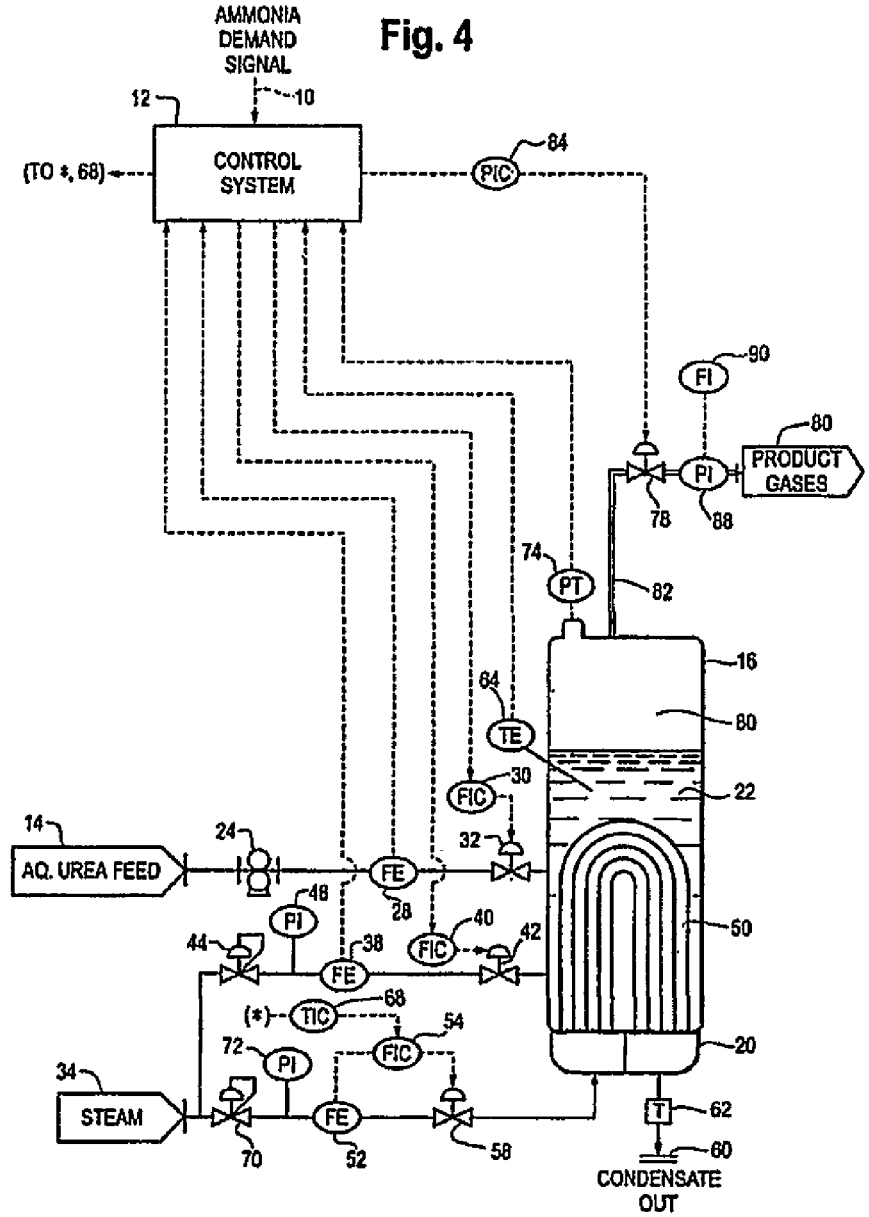

UNITED STATES PATENT AND TRADEMARK OFFICE
CERTIFICATE OF CORRECTION

PATENT NO. : 6,887,449 B2
APPLICATION NO. : 10/302531
DATED : May 3, 2005
INVENTOR(S) : Brooks et al.

It is certified that error appears in the above-identified patent and that said Letters Patent is hereby corrected as shown below:

In the drawings, Figure 5 should appear as shown below:

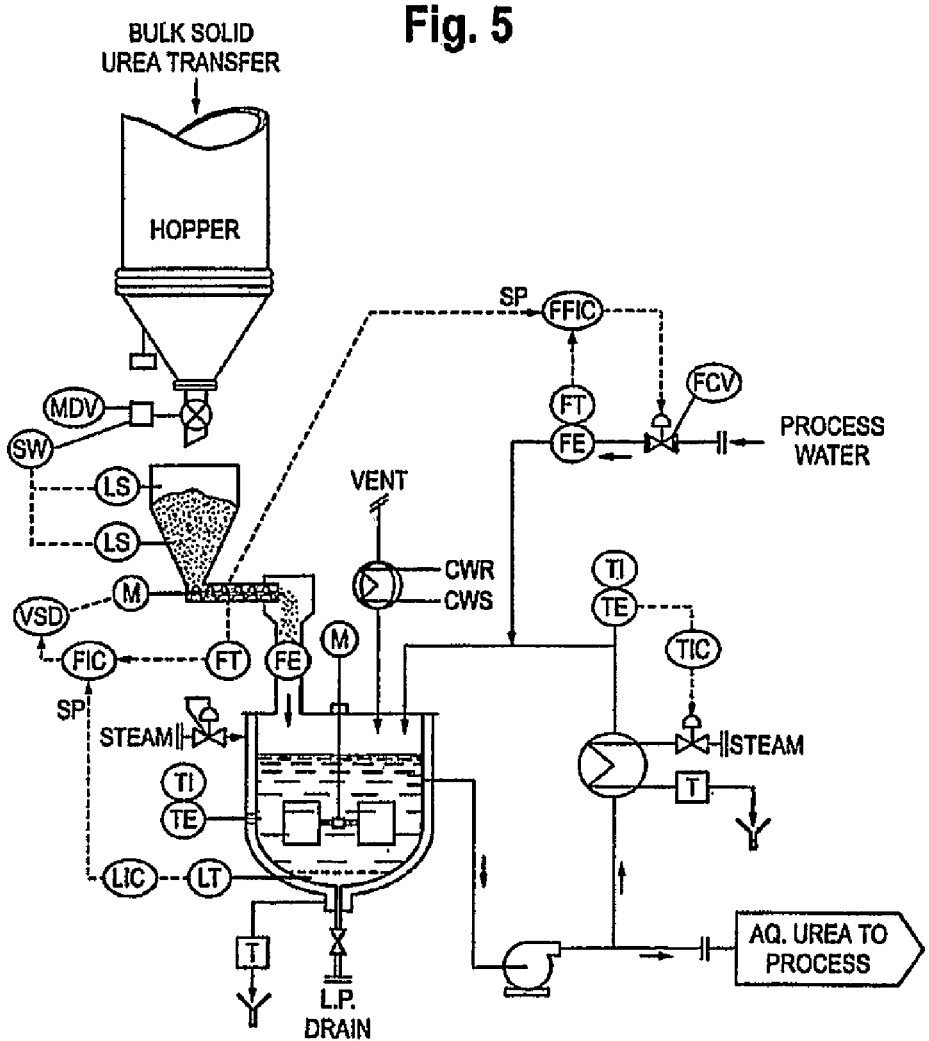

Fig. 5

UNITED STATES PATENT AND TRADEMARK OFFICE
CERTIFICATE OF CORRECTION

PATENT NO.        : 6,887,449 B2
APPLICATION NO. : 10/302531
DATED             : May 3, 2005
INVENTOR(S)       : Brooks et al.

It is certified that error appears in the above-identified patent and that said Letters Patent is hereby corrected as shown below:

In the drawings, Figure 6 should appear as shown below:

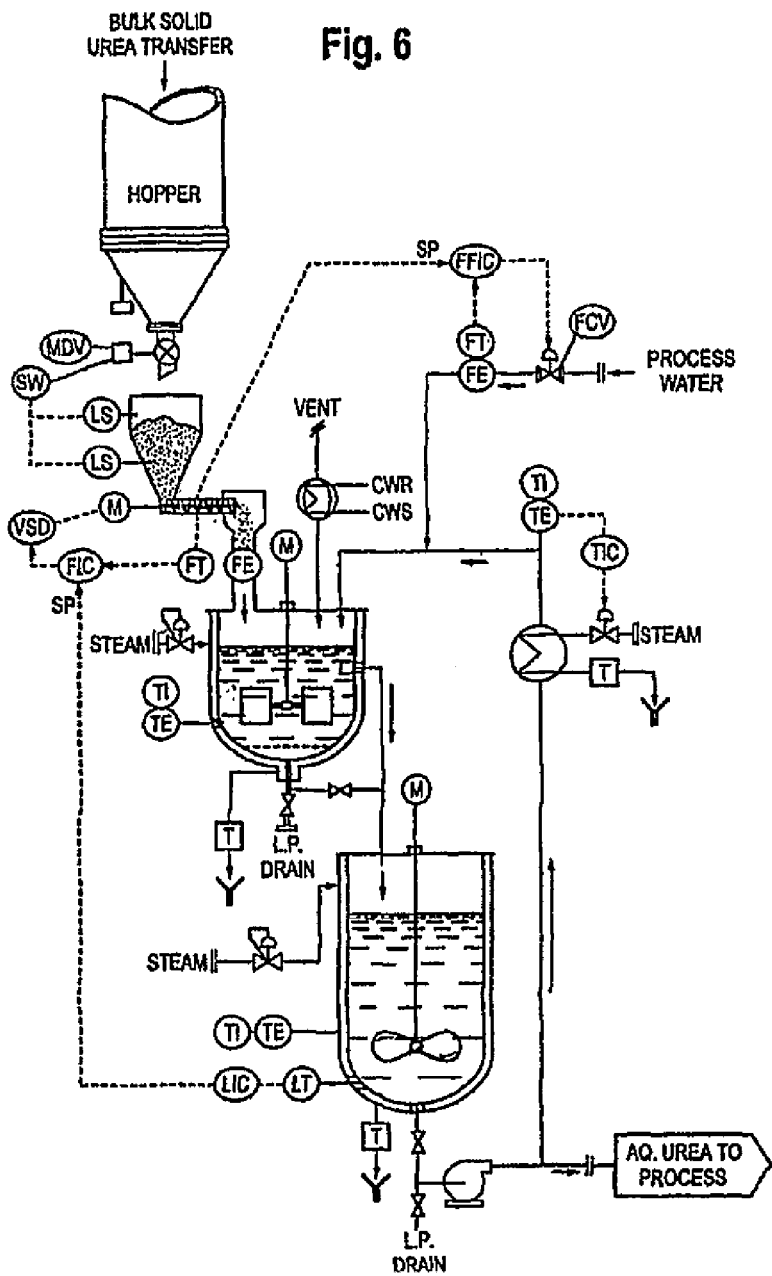

UNITED STATES PATENT AND TRADEMARK OFFICE
CERTIFICATE OF CORRECTION

PATENT NO. : 6,887,449 B2  Page 7 of 9
APPLICATION NO. : 10/302531
DATED : May 3, 2005
INVENTOR(S) : Brooks et al.

It is certified that error appears in the above-identified patent and that said Letters Patent is hereby corrected as shown below:

In the drawings, Figure 7 appear as shown below:

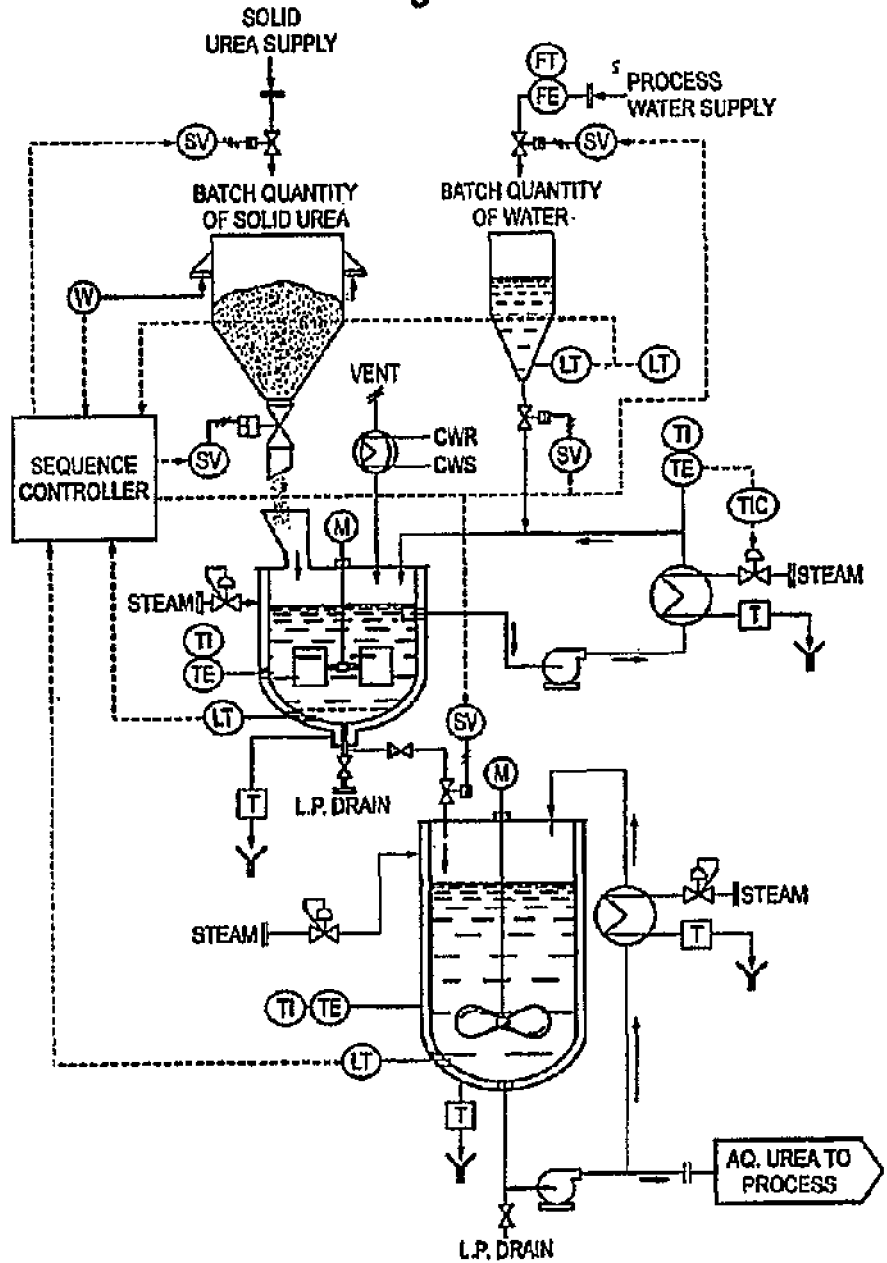

UNITED STATES PATENT AND TRADEMARK OFFICE
CERTIFICATE OF CORRECTION

PATENT NO. : 6,887,449 B2
APPLICATION NO. : 10/302531
DATED : May 3, 2005
INVENTOR(S) : Brooks et al.

It is certified that error appears in the above-identified patent and that said Letters Patent is hereby corrected as shown below:

Column 12, line 19, "animonium" should be --ammonium--.

This certificate supersedes Certificate of Correction issued August 28, 2007 and September 4, 2007.

Signed and Sealed this

Twenty-fifth Day of September, 2007

JON W. DUDAS
*Director of the United States Patent and Trademark Office*

United States Patent
Brooks et al.

(10) Patent No.: US 6,887,449 B2
(45) Date of Patent: May 3, 2005

(54) METHOD OF QUANTITATIVELY PRODUCING AMMONIA FROM UREA

(75) Inventors: Burton Brooks, Bellevue, WA (US); Walter A. Jessup, Seattle, WA (US); Brian W. MacArthur, Redmond, WA (US)

(73) Assignee: The Chemithon Corporation, Seattle, WA (US)

(*) Notice: Subject to any disclaimer, the term of this patent is extended or adjusted under 35 U.S.C. 154(b) by 246 days.

(21) Appl. No.: 10/302,531

(22) Filed: Nov. 21, 2002

(65) Prior Publication Data

US 2004/0101464 A1 May 27, 2004

(51) Int. Cl.⁷ .................................................. C01C 1/08
(52) U.S. Cl. .................................................. 423/358
(58) Field of Search .................................................. 423/358

(56) References Cited

U.S. PATENT DOCUMENTS

| | | | |
|---|---|---|---|
| 3,826,815 A | 7/1974 | Mavrovic | 423/356 |
| 3,900,544 A | 8/1975 | Lyon | 423/235 |
| 3,922,222 A | 11/1975 | Van Moorsel | 210/71 |

(Continued)

FOREIGN PATENT DOCUMENTS

| | | |
|---|---|---|
| DE | 0154 442 | 3/1982 |
| DE | 342 21 75 | 12/1985 |
| DE | 195 10 804 | 9/1996 |
| DE | 195 81 575 T1 | 4/1997 |
| DE | 198 34 980 | 12/1999 |
| EP | 0 326 943 | 8/1989 |
| EP | 0 342 184 | 11/1989 |
| EP | 0 487 886 | 6/1992 |
| EP | 0 582 022 A1 | 2/1994 |
| EP | 0 848 985 | 6/1998 |

(Continued)

OTHER PUBLICATIONS

Kucheryavi et al., "Kinetics of the Hydrolysis of Urea at High Temperatures in Relation to Purification of Waste Waters in Urea Manufacture"; translated from *Zhurnal Prikladnoi Khimii*, vol. 42, No. 7, pp. 1596–1600 (1969).

Blasiak et al., "Equilibrium Pressure in the System $NH_4CO_2NH_2 + H_2O$ at High Temperatures"; *Chemia Stosowana*, vol. 4, No. 545, pp. 545–550 (1983), no month.

Makansi, Jason Ed.; "Ammonia: It's coming to a plant near you"; *Power* pp. 20–22 (May, 1992).

(Continued)

*Primary Examiner*—Wayne A. Langel
(74) *Attorney, Agent, or Firm*—Marshall, Gerstein & Borun LLP

(57) ABSTRACT

Methods and apparatus for continuously, quantitatively producing gaseous ammonia from urea, including the steps of: dissolving urea in water to form concentrated aqueous urea comprising at least 77 wt. % urea; continuously feeding the concentrated aqueous urea into a reactor; continuously feeding a separate, additional supply water into the reactor to form an aqueous urea reaction mixture; heating the aqueous urea reaction mixture; and continuously withdrawing a gas phase product including ammonia from the reactor, is disclosed. Also disclosed are methods and apparatus for continuous and batchwise dissolution of urea to form aqueous urea solutions.

20 Claims, 7 Drawing Sheets